United States Patent
Raaphorst et al.

(10) Patent No.: US 9,868,503 B2
(45) Date of Patent: Jan. 16, 2018

(54) FOOT-ACTUATED STEERING MECHANISM FOR STAND-UP PADDLE BOARDS

(71) Applicant: Flow Sports, Inc., San Clemente, CA (US)

(72) Inventors: Mark Raaphorst, San Clemente, CA (US); Martin Giroud, San Clemente, CA (US); Anthony Scaturro, San Clemente, CA (US); Christoph Dworzak, San Clemente, CA (US); Andres Martinez, San Clemente, CA (US)

(73) Assignee: Flow Sports, Inc., San Clemente, CA (US)

( * ) Notice: Subject to any disclaimer, the term of this patent is extended or adjusted under 35 U.S.C. 154(b) by 0 days.

(21) Appl. No.: 15/146,216

(22) Filed: May 4, 2016

(65) Prior Publication Data

US 2017/0029083 A1    Feb. 2, 2017

Related U.S. Application Data

(60) Provisional application No. 62/199,131, filed on Jul. 30, 2015.

(51) Int. Cl.
| | |
|---|---|
| *B63H 25/00* | (2006.01) |
| *B63H 25/02* | (2006.01) |
| *B63H 25/38* | (2006.01) |
| *B63H 25/10* | (2006.01) |
| *B63B 35/79* | (2006.01) |
| *F16C 1/12* | (2006.01) |
| *B63B 35/71* | (2006.01) |

(52) U.S. Cl.
CPC ......... *B63H 25/02* (2013.01); *B63B 35/7926* (2013.01); *B63H 25/10* (2013.01); *B63H 25/38* (2013.01); *F16C 1/12* (2013.01); *B63B 35/71* (2013.01); *B63B 35/79* (2013.01); *B63B 2035/715* (2013.01)

(58) Field of Classification Search
CPC ........ B63H 25/02; B63H 25/10; B63H 25/38; B63B 35/7926; F16C 1/12
See application file for complete search history.

(56) References Cited

U.S. PATENT DOCUMENTS

| | | |
|---|---|---|
| 2,153,939 A | 4/1939 | Schaupp |
| 4,014,281 A | 3/1977 | Hemens |
| 4,286,533 A | 9/1981 | Sanner |
| 4,372,241 A * | 2/1983 | Tritt ................. B63H 25/382 114/162 |
| D293,096 S | 12/1987 | Keller |

(Continued)

FOREIGN PATENT DOCUMENTS

| | | |
|---|---|---|
| DE | 3013411 A1 | 10/1981 |
| DE | 8912536 U1 | 1/1990 |

(Continued)

*Primary Examiner* — Stephen P Avila
(74) *Attorney, Agent, or Firm* — Mintz Levin Cohn Ferris Glovsky and Popeo, P.C.

(57) ABSTRACT

A steering system for a vessel includes a tiller system having a tiller arm; a rudder system having a rudder; and a push rod system having a push rod linking the tiller arm to the rudder. Actuation of the tiller arm moves the rudder in an orientation providing directional control over the vessel.

44 Claims, 37 Drawing Sheets

(56) References Cited

U.S. PATENT DOCUMENTS

| | | |
|---|---|---|
| D301,226 S | 5/1989 | Wood, Jr. |
| 5,676,079 A * | 10/1997 | Depke .................. B63H 25/382 |
| | | 114/162 |
| 6,183,333 B1 | 2/2001 | Hall |
| 6,199,499 B1 | 3/2001 | Horais |
| 6,347,599 B1 | 2/2002 | Hendrickson |
| 7,370,593 B1 | 5/2008 | Horais |
| 996,444 A1 | 6/2011 | Yarrington |
| D662,164 S | 6/2012 | Morrelli et al. |
| 9,248,890 B2 | 2/2016 | Raaphorst |
| 2003/0167991 A1 | 9/2003 | Namanny |
| 2010/0203778 A1 | 8/2010 | Ketterman et al. |
| 2011/0111650 A1 | 5/2011 | Braden et al. |
| 2014/0102241 A1 | 4/2014 | Rao et al. |

FOREIGN PATENT DOCUMENTS

| | | |
|---|---|---|
| EP | 0146240 A1 | 6/1985 |
| FR | 2643328 A1 | 8/1990 |

* cited by examiner

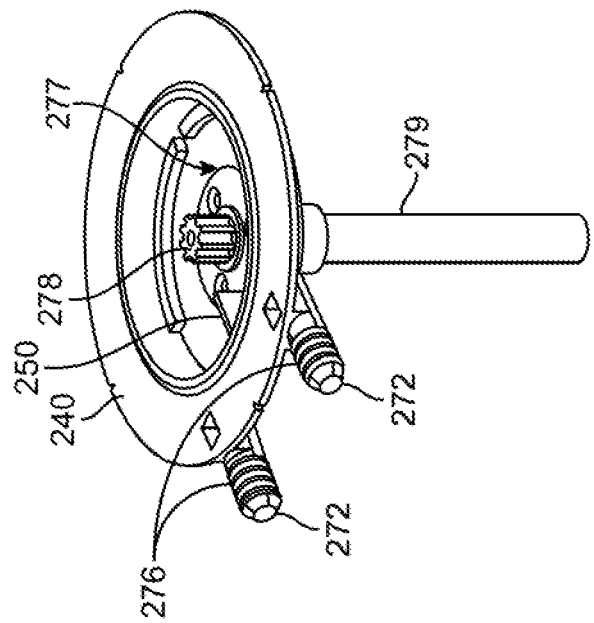
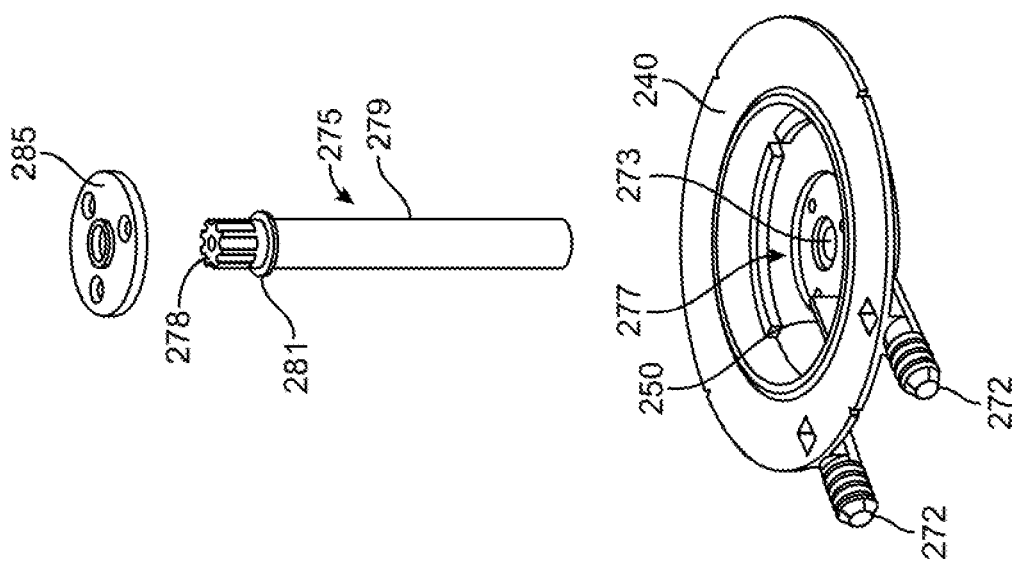

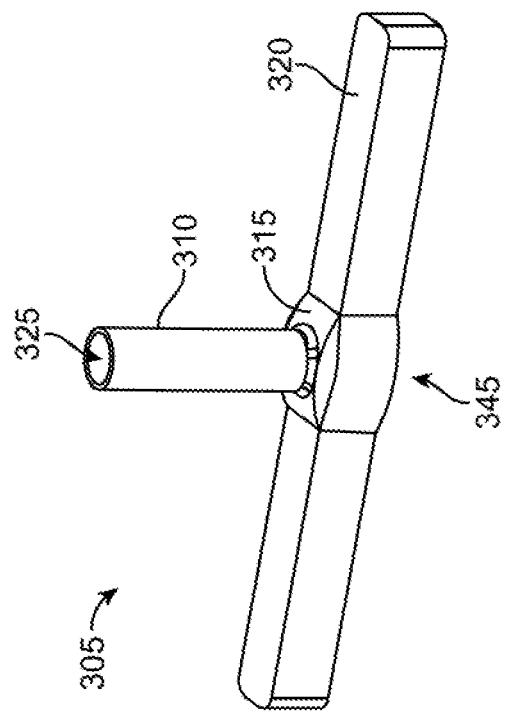
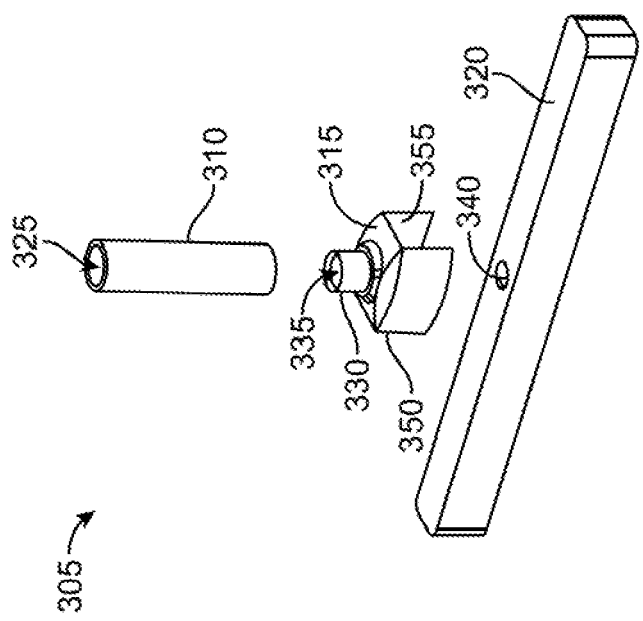

FOOT-ACTUATED STEERING MECHANISM FOR STAND-UP PADDLE BOARDS

CROSS-REFERENCE TO PRIORITY DOCUMENT

This application claims the benefit of priority of U.S. Provisional Patent Application Ser. No. 62/199,131, filed Jul. 30, 2015. Priority of the filing date is hereby claimed and the disclosure of the provisional patent application is hereby incorporated by reference in its entirety.

FIELD

The subject matter described herein relates to systems and methods for vessels, such as stand-up paddle boards, that use a steering system or a directional control system. In addition, the vessel can include a foot-actuated steering mechanism that can control the movement and positioning of at least one moveable rudder extending from the board.

BACKGROUND

A variety of vessels, especially a stand-up paddle board, can benefit from a steering mechanism. These vessels can be enjoyed in a variety of bodies of water around the world, such as lakes, rivers and oceans. Most vessels have some physical, mechanical or environmental means of propulsion such as a paddle or paddles, paddle with one's own arms and hands, motorized power and/or wind power. Some vessels allow a user to stand, lay or sit while paddling and/or controlling the direction by way of a steering mechanism on or within a body of water.

In addition, due to the size of a vessel and hull shape, other factors such as a fixed fin, dagger board, or rudder, provide positive tracking that limits directional and dynamic control. Most vessels, including some stand-up paddle boards, prone paddle boards, catamaran, kayaks and canoes, among others, have difficulty maintaining or changing the direction of travel of the vessel. For example, a user of a stand-up paddle board can expend a significant amount of energy in order to either propel or change the direction of travel of the stand-up paddle board. Therefore, it can be beneficial for a user to have assistance by way of a steering control system in order to manipulate the vessels directional orientation and/or direction or angle of travel in order to better reach their desired destination. Such directional control also mitigates the overuse and fatigue of certain sides of the body, muscle groups and may help the user preserve energy while improving the speed and efficiency of the vessel. Furthermore, external factors such as wind, current, waves and cross chop may have an influence over the orientation and directional travel of the vessel, which may have a positive or negative effect over the orientation of the vessel and/or directional control of the vessel.

The details of one or more variations and implementations of the steering system and methods are set forth in the accompanying drawings and the description below. Other features and advantages will be apparent from the description and drawings, and from the claims. For purposes of illustration as to the steering system, mechanisms, installation and otherwise execution, a stand-up paddle board is used as the example, however, the steering system may be implemented into a wide variety of vessels and adapted accordingly to fit the varying requirement. The intended purpose of such a system, regardless of the specific type of vessel, remains consistent with the descriptions provided herein.

SUMMARY

In one aspect, disclosed is a steering system for a vessel. The steering system includes a tiller system having a tiller arm; a rudder system having a rudder; and a push rod system having a push rod linking the tiller arm to the rudder. Actuation of the tiller arm moves the rudder in an orientation providing directional control over the vessel. The vessel can be a stand-up paddle board, prone board, kayak, canoe, or boat.

The rudder can include a lock-off mechanism. The lock-off mechanism can secure the rudder to a user-configurable position that is equal to, less than or greater than a zero axis coincident to a center line of the vessel. The rudder can be registered on a zero axis to ensure the rudder is coincident to a center line of the vessel prior to use and the lock-off mechanism maintains the rudder on the zero axis upon release of the tiller arm. When the rudder is in the zero axis position a leading edge and trailing edge of the rudder can be coincident to the center line of the vessel. The tiller system can include an active tiller set having a tiller, the tiller arm, a tiller cup and a spring. The active tiller set can be usable for steering and can be positioned on at least one side of a center line of the vessel. The tiller system can further include a dummy tiller set positioned on an opposite side of the center line of the vessel from the active tiller set. The dummy tiller set can include a tiller, a tiller cup, and a dummy cover. The dummy cover can cover the tiller cup and need not have active steering capabilities. The active tiller set and the dummy tiller set can be interchangeable between the starboard side and port side of the vessel.

The tiller can have a first end coupled to the tiller cup and a second end forming the tiller arm extending away from the tiller cup. The tiller cup can be positioned within a recess of the vessel and can be sized and shaped to receive at least a portion of the tiller. The tiller arm can be dynamic and directly actuatable by a user's foot or hand, or indirectly actuatable via a remote control. Actuation of the tiller arm can include moving the tiller arm back and forth around a rotational axis of the tiller arm. Moving the tiller arm around the rotational axis can cause the push rod to rotate the rudder in an orientation that gives way to the directional control of the vessel. The tiller arm can be positioned generally parallel to a deck region of the vessel. The tiller arm can include a grip feature projecting upwards away from the deck region. The tiller arm can be configured to be actuated from the starboard side, the port side of the vessel, or both the starboard side and the port side. The tiller arm can be removable and can be installed on either or both the starboard or port side. The tiller arm can have a form factor that is low profile such that a user can stand atop the tiller arm.

The spring of the active tiller set can be a non-mechanical torsion spring. The spring can be a solid, unitary piece of flexible material having a c-shape. The spring can supply a force when deformed upon rotation of the tiller arm around a rotational axis of the tiller arm. The torsion spring can have a return-to-center effect such that the spring returns the rudder to a zero degree position relative to the centerline of the vessel when no lateral load is imposed upon the spring. The spring can ensure the tiller system and the rudder system are registered on a zero axis such that the rudder is coincident to the center line of the vessel along the zero axis.

The push rod can provide synchronized movement between the tiller arm and the rudder. The push rod can be a solid material that allows a push-pull effect from the tiller arm to the rudder providing a direct and powerful steering impulse. The push rod can be secured at one end to a region of the tiller cup and at an opposite end to a region of a rudder cup. The push rod can be secured within the tiller cup by way of a push rod stopper. The push rod system can further include a conduit for the push rod to slide within. The conduit can provide protection of the push rod against damage. The conduit can be recessed within channels formed internally below a top surface of a deck of the vessel. The conduit can be plumbed into the deck of the vessel such that the tiller arm remains generally parallel to the deck of the vessel. The conduit can be installed externally to a top surface of a deck of the vessel. The push rod can move freely through the conduit upon actuation of the tiller system. The conduit can provide a watertight seal. The push rod system can include two push rods extending through respective conduits. The conduit can be a tubular element connecting a rudder cup to a tiller cup.

The tiller cup can have a first conduit connection tube on an inside of the tiller and a second conduit connection tube on an outside of the tiller such that the push rod is connectable on the right or the left side of the tiller cup and the tiller determines in which direction the rudder moves when the tiller arm is actuated. When the push rod is mounted to the inside of the tiller via the first conduit connection tube, the push rod can move the rudder in a first direction upon movement of the tiller arm to the left. When the push rod is mounted to the outside of the tiller via the second conduit connection tube, the push rod can move the rudder in a second opposite direction upon movement of the tiller arm to the left. Mounting of the push rod to the tiller system can invert the orientation when the tiller arm is actuated in the same manner. The rudder system can further include a pre-fin attached by a hinge to the rudder. The pre-fin can have a sloping shape.

In some variations, one or more of the following can optionally be included in any feasible combination in the above methods, apparatus, devices, and systems. More details of the methods, apparatus, devices, and systems are set forth in the accompanying drawings and the description below. Other features and advantages will be apparent from the description and drawings.

BRIEF DESCRIPTION OF THE DRAWINGS

These and other aspects will now be described in detail with reference to the following drawings. Generally speaking the figures are not to scale in absolute terms or comparatively but are intended to be illustrative. Also, relative placement of features and elements may be modified for the purpose of illustrative clarity.

FIG. 10A is an exploded view of a portion of the rudder system;

FIG. 10B is a perspective view of the portion of the rudder system in FIG. 10A;

FIG. 12A is an exploded view of the fin box set;

FIG. 12B is an assembled view of the fin box set of FIG. 12A;

Like reference symbols in the various drawings indicate like elements.

DETAILED DESCRIPTION

The subject matter described herein relates to systems and methods for stand-up paddle boards or other types of vessels, prone boards, boats, kayaks, canoes, outrigger canoes, hereinafter ("vessel") and any vessels that may use a steering system or a directional control system, hereinafter ("steering"). In addition, the vessel can include a foot-actuated steering mechanism that can control the movement and positioning of at least one moveable rudder extending from the vessel. Other ways to actuate the steering and steering mechanisms may also be applicable such as using a steering controller directly connected to the steering or remotely connected to the steering such as a remote control and servo.

In some implementations, described is a stand-up paddle board system including a board and a steering system that can assist a user in maneuvering the stand-up paddle board. The steering system can be used to control the movement and positioning of at least one moveable rudder extending from a bottom surface of the board. The steering system can be actuated without significantly disrupting the user's performance while using the stand-up paddle board. For example, a user's performance can be disrupted if the user has to significantly alter the user's body positioning or interrupt paddling. Additionally, in at least some implementations, the steering system can be activated by a user, such as by moving a tiller, in order to effectuate a simultaneous change in position of a rudder relative to the bottom surface of the board. The ability of the user to change the position of at least one moveable rudder can assist the user in positively and more efficiently maneuvering and directing the orientation of the stand-up paddle board system.

The systems described herein provide greater control over the directional orientation of the vessel and may provide significant benefit in terms of speed, directional control, stability and even provide some safety benefits as it may assist a vessel to stay or steer on such a course that would allow the vessel to return to a desired or at least safe landing location where adverse conditions, without the assistance of steering, may otherwise be more difficult if not impossible.

Figure 1:
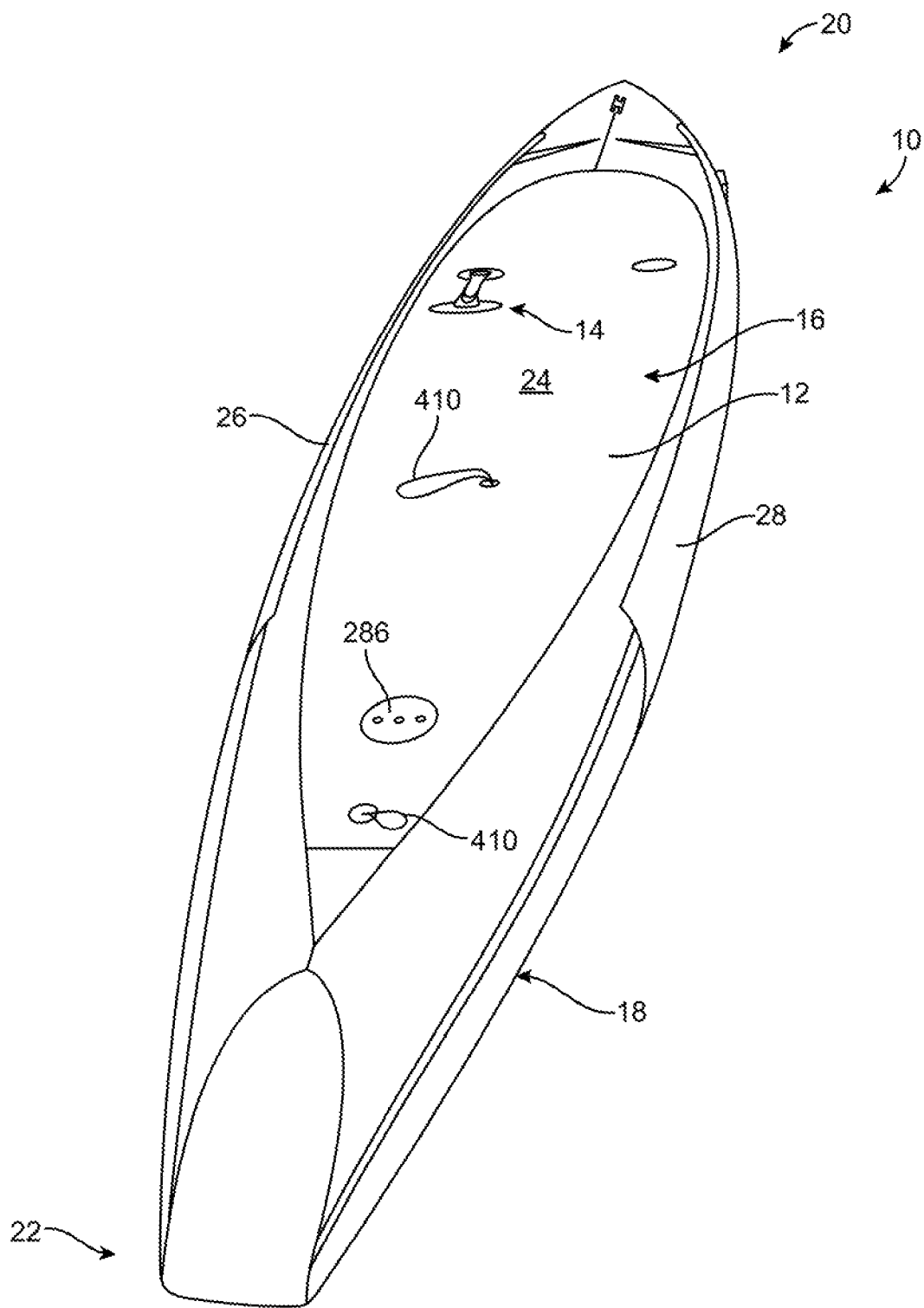
FIG. 1 shows an implementation of a stand-up paddle board with an integrated steering system.

FIG. 1 illustrates an implementation of a stand-up paddle board system 10 including a board 12 and a steering system 14. The board 12 can have a top surface 16 and a bottom surface 18. The top surface 16 is designed for an operator to stand, sit or lay on the board 12. The bottom surface 18 contacts the water on which the board 12 floats. The board 12 has sufficient buoyancy to stay afloat while the operator is positioned on the top surface 16. The board 12 also has a forward or bow end 20 and a rearward or stern end 22. The operator can be positioned between the stern and the bow ends 20, 22 on a deck region 24. Generally, the deck region 24 is near the middle of the board 12 between the starboard side 28 and the port side 26 of the board 12. The steering system 14 can be actuated by the operator from the deck region 24 on and with the steering system 14 on the starboard side 28 or the port side 26 or both. It may also be located anywhere on the top surface 18 so long as the steering system 14 design can be adapted to a configuration without compromising the fundamental design principals and functionality.

Figure 2A:
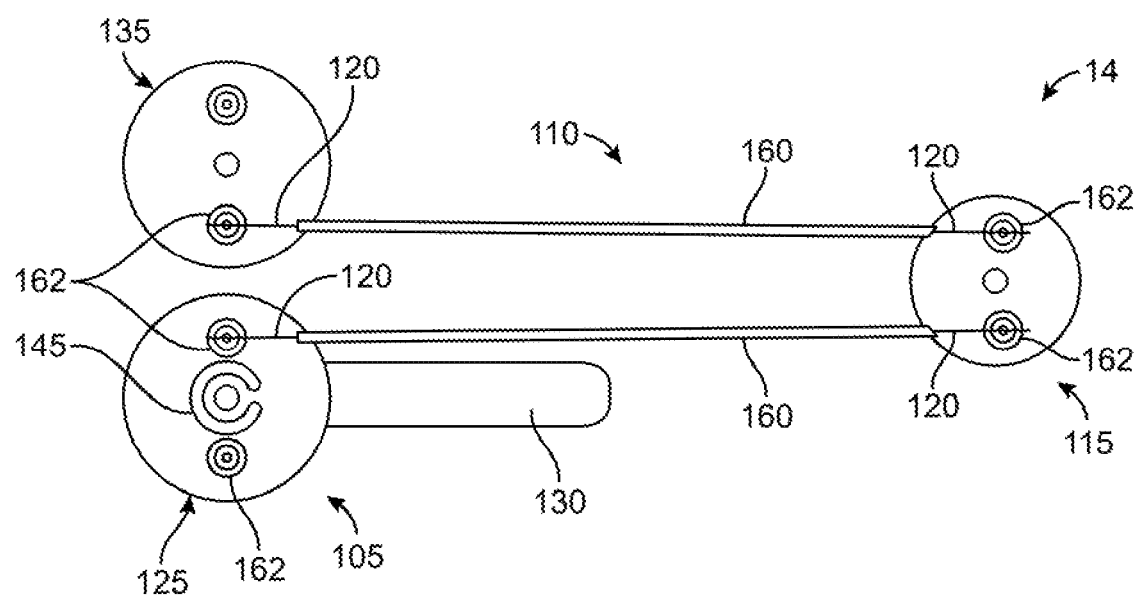
FIG. 2A shows a top view of an implementation of a steering system for a stand-up paddle board.
Figure 2B:
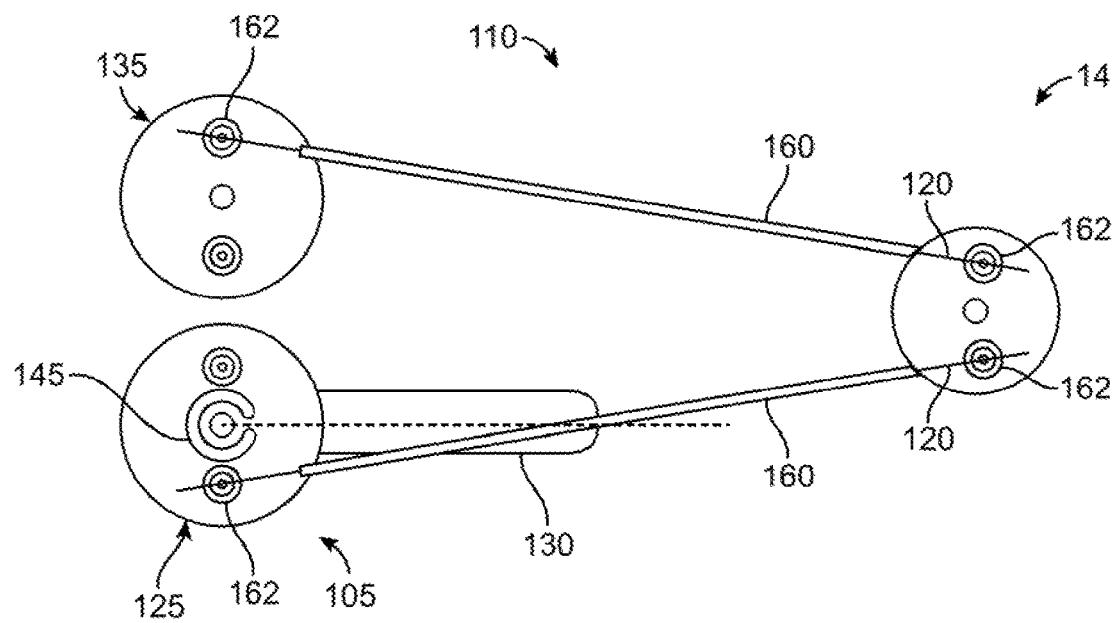
FIGS. 2B-2C illustrate actuation of the steering system of FIG. 2A.
Figure 2C:
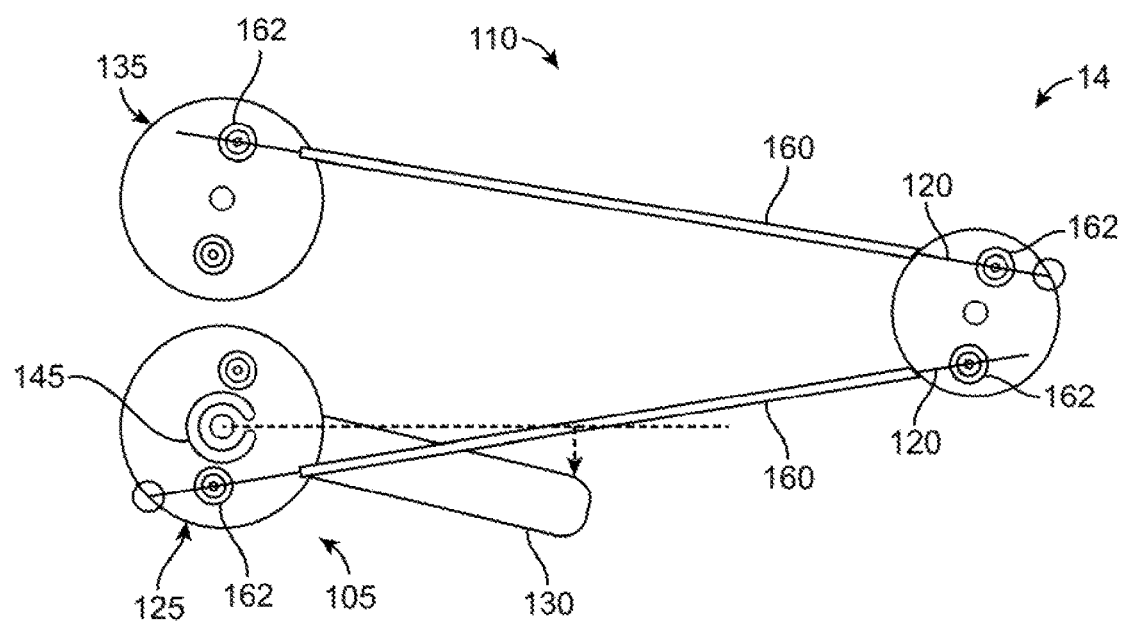

The steering system 14 can include a tiller system 105, a push rod system 110, and a rudder system 115 (see FIGS. 2A-2C). The steering system 14 can include a tiller system 105 having at least one moveable tiller arm 130, at least one push rod system 110 having one or more push rods 120 contained at least in part within respective conduits 160, and a rudder system 115 having at least one moveable rudder 170 (see FIGS. 9, 14A-14D, 12A-15B), each of which will be described in more detail herein. The tiller system 105 can be actuated to move the rudder system 115 in the desired direction/orientation providing directional control of the board 12. The push rod system 110 provides a mechanical linkage between the tiller system 105 and the rudder system 115 to synchronize movement of the overall steering system 14. The steering system 14 allows for a mechanical coupling from the at least one tiller arm 130 to the at least one moveable rudder 170 by the one or more push rods 120.

As will be described in more detail below the steering system 14 is dynamic and lockable. The rudder system 115 as well as the tiller system 105 can be registered on a zero axis to ensure the rudder 170 is coincident to the center line C of the board 12 (bow to stern) prior to use. The rudder system 115 can also include a lock-off mechanism that secures the rudder system 115 in a fixed position or axis. The axis can be user-configurable and can be generally equal to, less than or greater than the zero axis. The rudder system 115 when locked off can ensure the rudder 170 is positioned along the zero axis such that the leading and trailing edges of the rudder 170 are coincident to the center line C of the board 12. The lock-off mechanism can be useful, for example, in the event that any of the mechanical components breaks or becomes undesirable and steering capabilities are affected or rendered inoperable. The lock-off mechanism can lock the rudder 170 on a zero axis allowing the board 12 to maintain a straighter tracking and allow the operator to maintain directional control over the board 12. Lock-off the system in order to service the steering system 14 or disable it during use of the stand-up paddle board 12. The lock-off mechanism can be integrated into either or both the rudder system 115 and the tiller system 105. The ability to lock-off the steering at a zero axis depends upon proper setup of the overall system. By locking off the rudder system 115 and rudder 170 at a zero axis can provide the proper alignment of the rudder system 115 and specifically the rudder 170 with the push rod(s) 120 and the tiller system(s) 105. The tiller system 105 can be configured such that it can be locked at a desired angle less than or greater than zero, in order to compensate for external forces such as a cross wind, current or otherwise.

Figure 3A:
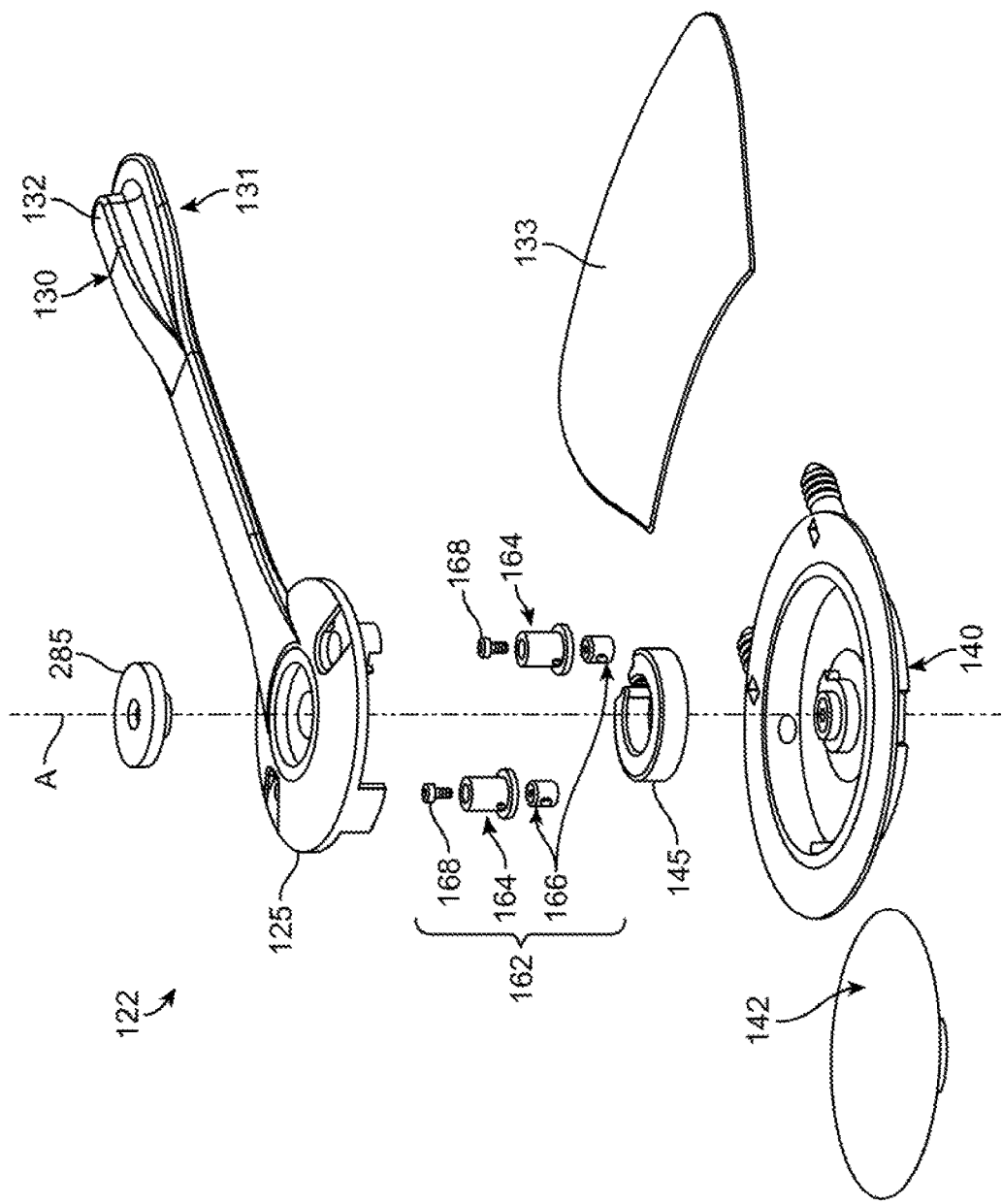
FIGS. 3A and 3B are exploded views of a tiller, a tiller cup and the associated componentry, respectively, of the steering system.

The tiller system 105 can include an active tiller set 122 (see FIG. 3A). The active tiller set 122 is intended to be used for steering and can be positioned on at least a one side of the center line C of the board 12 (e.g. either or both starboard 28 and port 26 sides). The active tiller set 122 can include a tiller 125, a tiller arm 130, a tiller cup 140 and a spring 145, each of which will be described in more detail below. The tiller system 105 can also include a dummy tiller set 124 (see FIG. 3B) that can include a dummy cover 135 to cover the tiller cup 140 when the tiller arm 130 is being used on the opposite side or two dummy covers 135 may be used should it be desirable to lock-off mechanism be activated in order to render the steering system 14 inoperable and the rudder system 115 to become locked and fixed. The dummy tiller set 124 does not have active steering capabilities in that it does not include the tiller arm 130 or the spring 145. The dummy tiller set 124 can be positioned on the opposite side of the center line C of the board 12 from the active tiller set 122. The tiller system 105 can be interchangeable in that the active tiller set 122 and the dummy tiller set 124 can be swapped between the starboard side 28 and port side 26 of the board 12. It should be appreciated that the active tiller set 122 can be used on both the starboard side 28 and the port side 26 of the board 12. It should be appreciated that if a fixed fin type of rudder is used with the steering system 14 that the tiller arm 130 or tiller arms 130 may be removed and a dummy cover 135 or covers 135 may be installed to cover one or more of the tiller cups 140 or rudder cups.

Again with respect to FIG. 3A, the tiller 125 can have a first end coupled to the tiller cup 140 and a second end forming the tiller arm 130 extending away from the tiller cup 140. The tiller cup 140 can be a generally stationary element positioned within a recess 29 of the board 12 that is sized and shaped to receive at least a portion of the tiller 125. The tiller arm 130 is generally dynamic and can be manipulated by a user's foot or a hand or an alternative other mechanism. Actuating the tiller arm 130 by moving it back and forth around its rotational axis A can via the one or more push rods 120 cause the rudder system 115 to rotate in an orientation that gives way to the directional control of the board 12. The operator can move the tiller arm 130 directly or the tiller arm 130 (as well as other components of the steering system 14) can also be controlled remotely for example a remote control and a servo connected to the tiller system 105 or the rudder system 115.

Again with respect to FIG. 3A and also FIGS. 4A-4F, the tiller arm 130 can have a first end region 131 extending towards where an operator would generally stand on the deck region 24 of the board 12. The tiller arm 130 can be positioned generally parallel to the deck region 24. First end region 131 of the tiller arm 130 can include toe grip feature 132 projecting upwards away from the deck region 24 and configured to be engaged by an operator's foot or toe. The toe grip feature 132 can have rounded edges and/or a coating of soft material such as EVA to improve comfort and gripping for the operator as the operator slides or actuates the tiller arm 130 side to side. A tiller pad 133 can be positioned on either or both sides of the board 12 to lessen friction between the tiller arm 130 and the top surface 16 of the board 12. The tiller pad 133 can be positioned under the first end region 131 of the tiller arm 130.

Figure 3B:
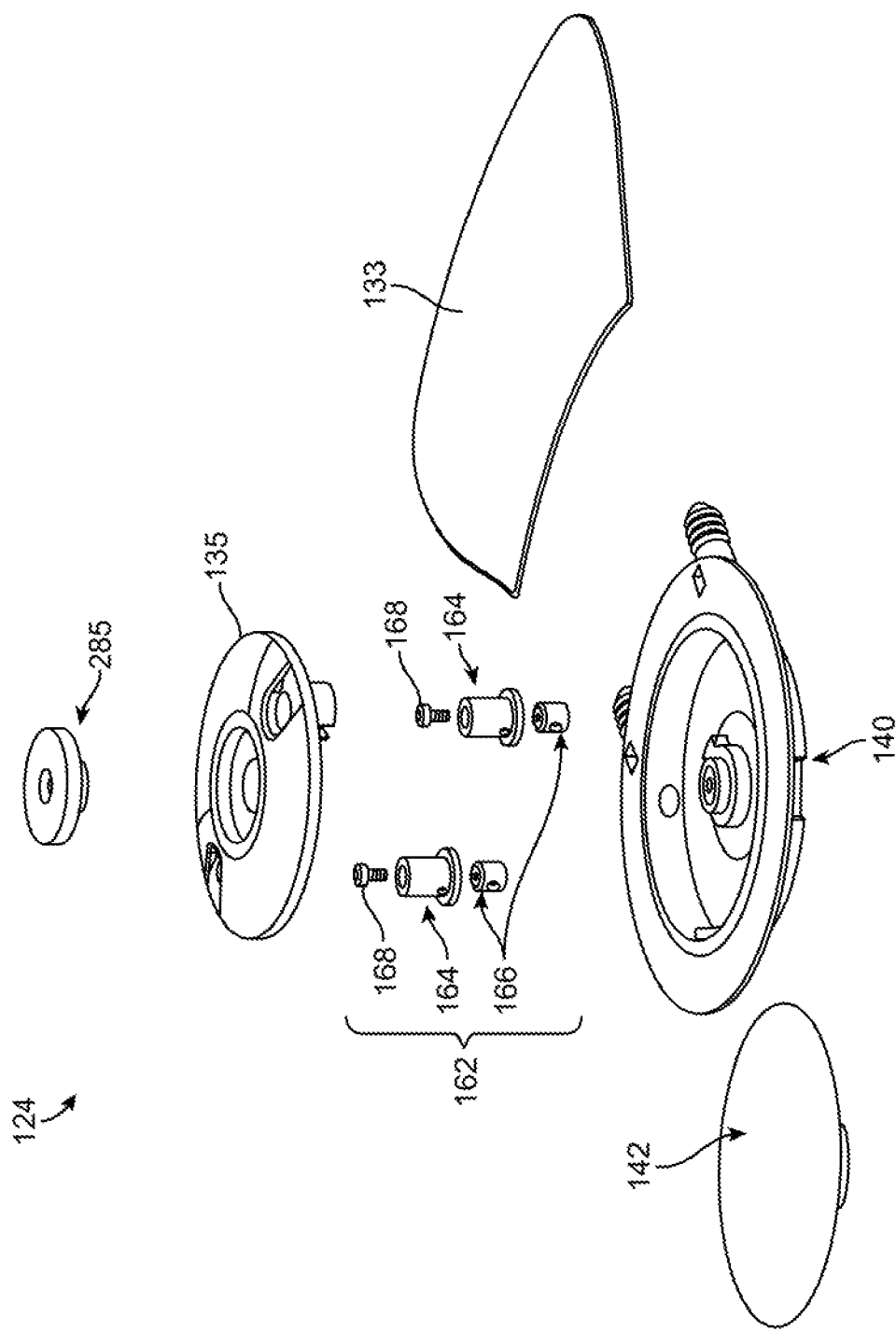
Figure 4A:
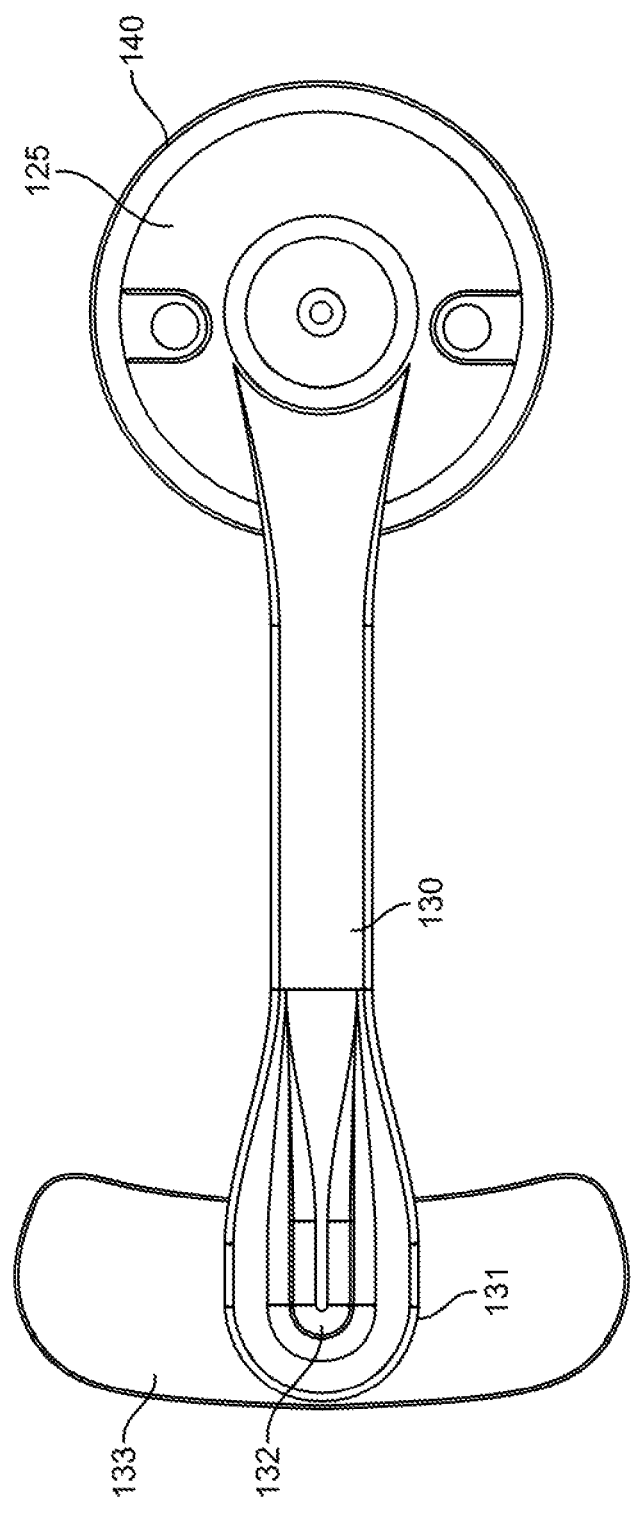
FIGS. 4A, 4B, 4C, 4D, 4E, and 4F are various views of a tiller having a tiller arm.
Figure 4B:
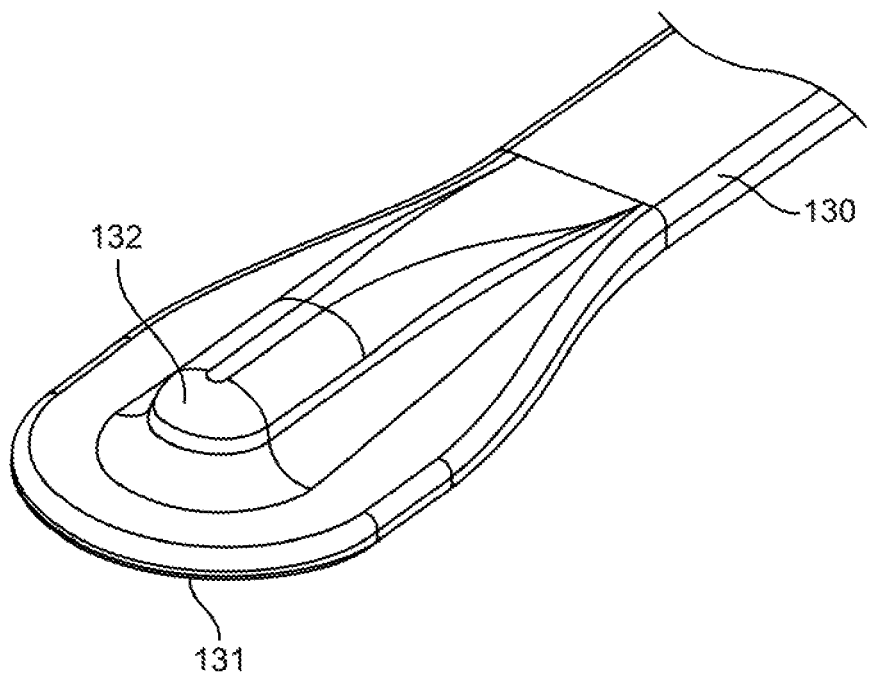
Figure 4C:
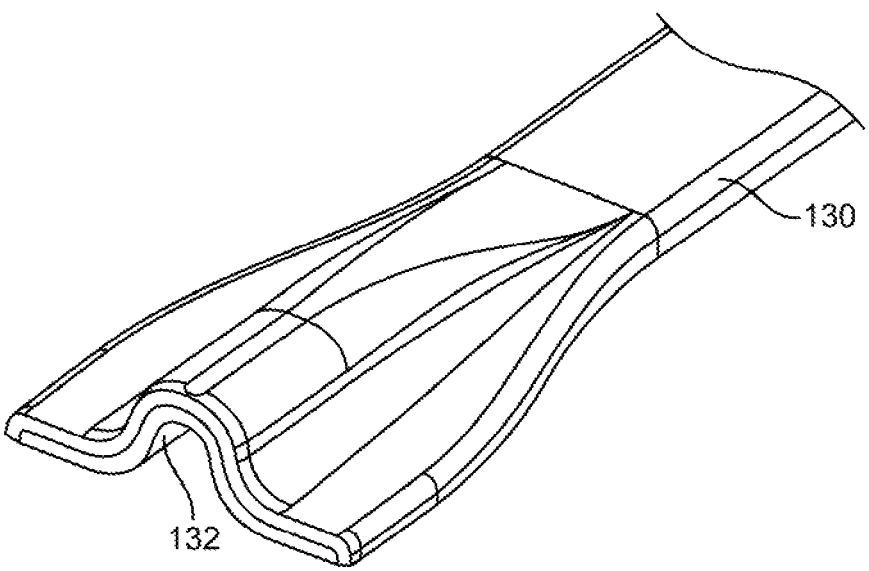
Figure 4D:
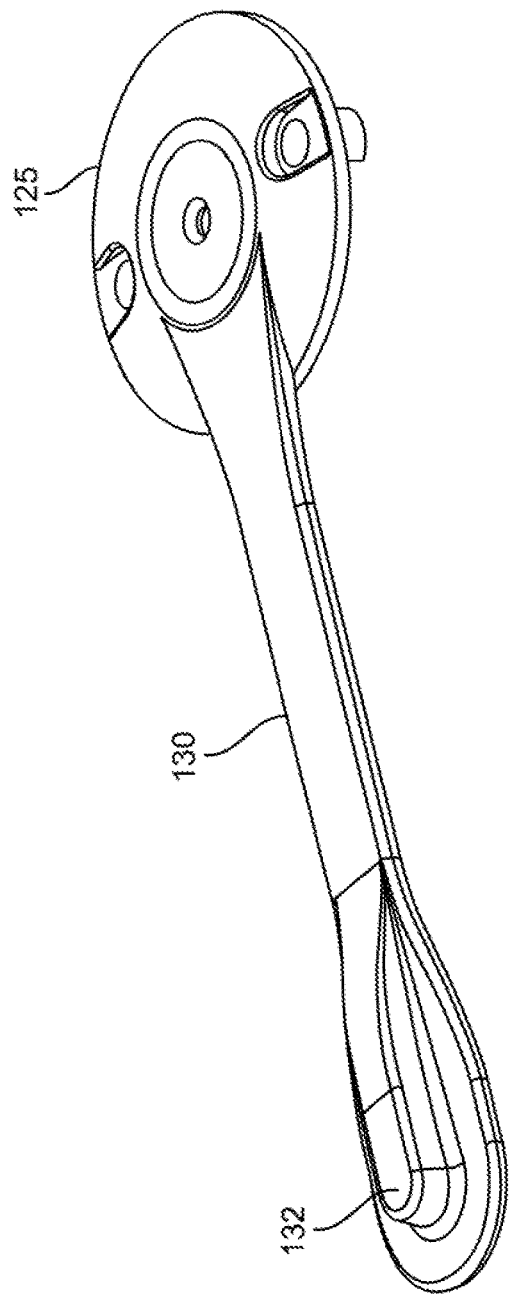
Figure 4E:
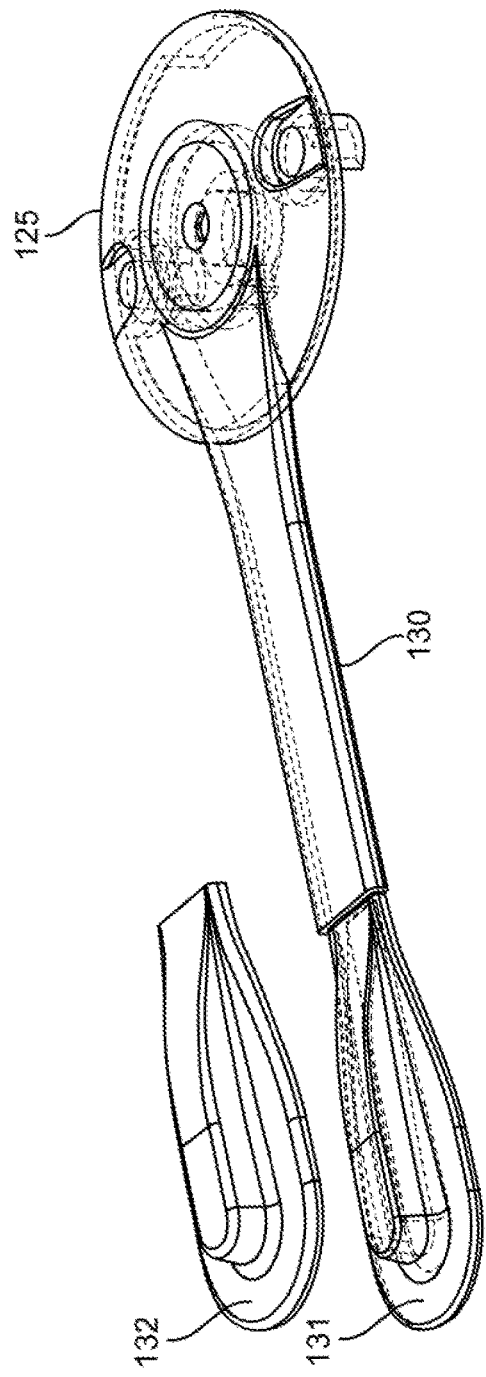
Figure 4F:
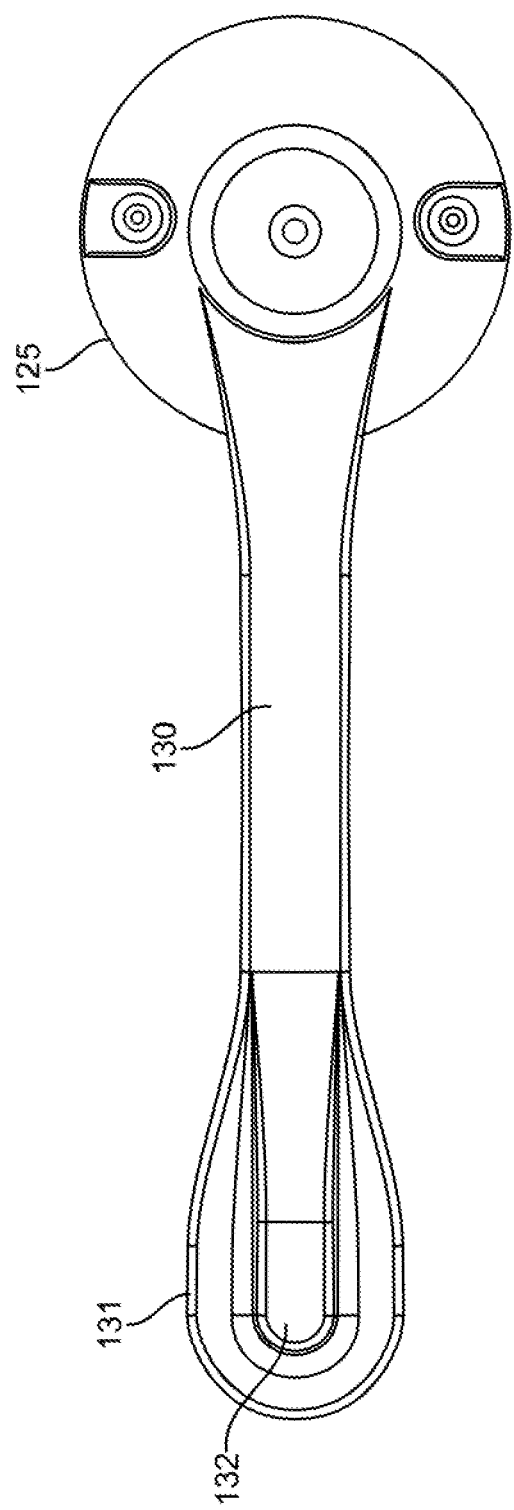

FIGS. 3A and 3B also should that a sacrificial cap 142 can be used during installation of the steering system 14, such as during the lamination process. The steering system 14 can be predominantly installed into a core of the board 12 or into a mold during the manufacturing process. The sacrificial caps 142 can cover the tiller cups 140 (or rudder cup 240) to protect the cups from resin that may flow into the cups during the lamination process and potentially contaminate the cups with resin. This can result in poor aesthetics and/or compromise the integrity of the design and/or function of the steering system 14. After the fiberglass like material is laminated over the deck region 24 with resin and the resin cures, the fiberglass may be removed using a router or similar device to expose the tiller cups 140 and rudder cup 240 allowing for the remaining steering system 14 components to be installed.

As mentioned above, the active tiller set 122 can include a spring 145. The spring 145 can be a solid, unitary piece of flexible material that supplies a force when deformed (e.g. upon rotation of the tiller arm 130 around the rotational axis A). The unitary design of the spring 145 can mitigate and/or eliminate the possibility of corrosion and clogging making it more reliable than, for example, a coil spring, helical spring, or other mechanical springs. The spring 145 can be a torsion spring such that the load applied is a torque or twisting force and an end of the spring 145 rotates through an angle as the load is applied. The spring 145 can be a non-coiled spring such as a c-shaped flexible element of solid unitary piece of material.

The c-shaped spring 145 can be configured to open and/or deform upon rotation of the tiller arm 130 around its axis A to provide the desired spring effect. As mentioned, the tiller arm 130 and tiller 125 are configured to rotate around the rotational axis A range of degrees. Opposing ends 146 forming the discontinuity of the c-shape spring can be moved further apart as the tiller arm 130 is moved around its axis A when lateral load forces or torque is applied. The spring 145 can then cause the tiller 125 and thus, the tiller arm 130 extending from the tiller 125 to return to center or a zero degree position on the centerline C when lateral load forces or torque are no longer imposed upon it. The spring 145 can apply a force that allows for a comfortable operation of the tiller 125 and foot-actuated movement of the tiller arm 130, but also strong enough to return the rudder system 115 to zero degrees even against an amount of force imposed by water pressure on and/or around the rudder 170.

Figure 5A:
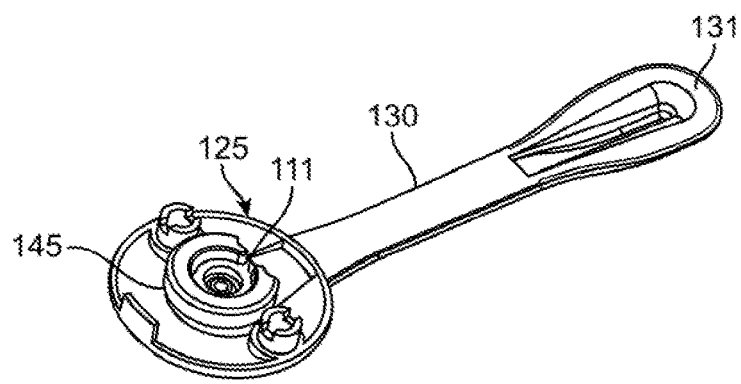
FIG. 5A is a perspective, bottom view of a tiller.
Figure 5B:
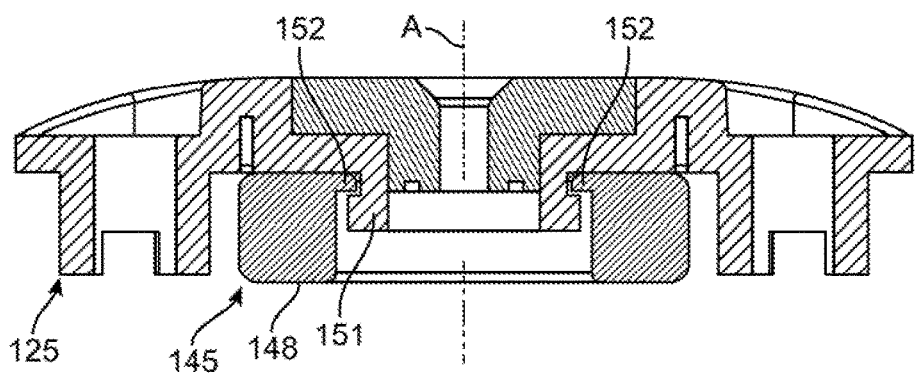
FIG. 5B is a cross-sectional partial view of the tiller in FIG. 5A.
Figures 5C, 5D:
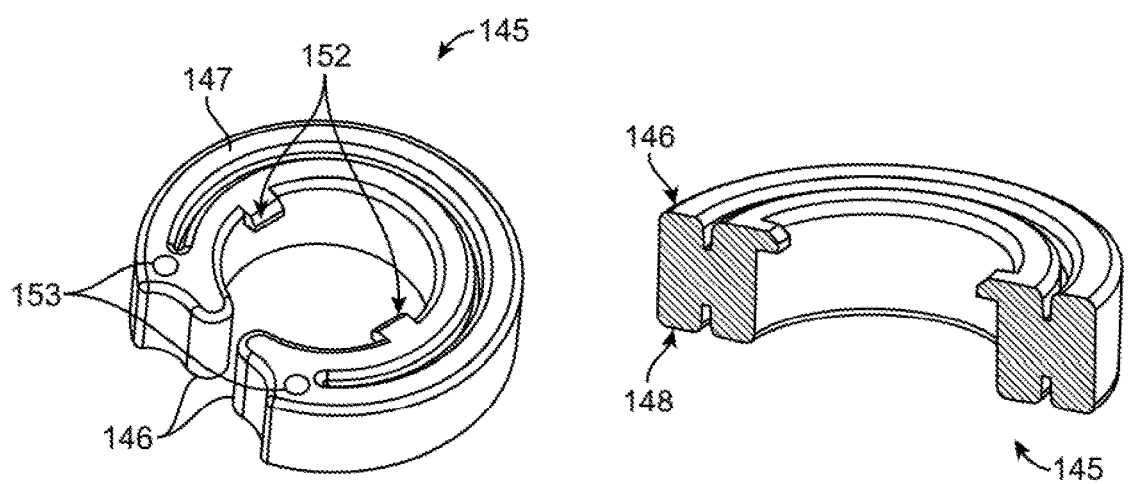
FIG. 5C is a perspective view of a spring of the tiller of FIG. 5A.
FIG. 5D is a cross-sectional view of the spring of FIG. 5C.
Figure 5E:
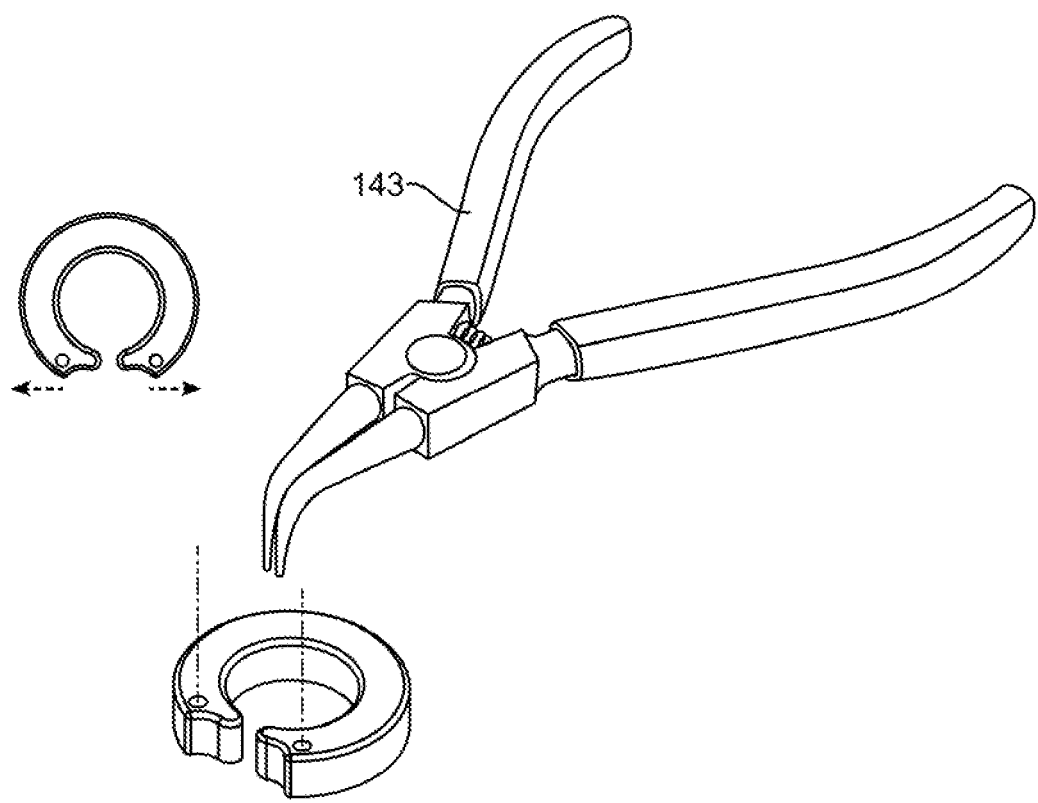
FIG. 5E is a view of a tool configured to engage the spring of FIG. 5C.

The spring 145 can be connected to or reside within the underside of the tiller 125 captured between the underside of the tiller 125 and an upper surface of the interior region 177 of the tiller cup 140 such that a central axis of the spring 145 is coaxial with a rotational axis A of the tiller 125 (see FIGS. 5A-5E). The tiller 125 can have a central post 151 (see FIGS. 5A-5B) and the tiller cup 140 can include a central post 149 (see FIGS. 6A-6B). An inner diameter of the c-shaped spring 145 can approach an outer diameter of the posts 149, 151 of the underside of the tiller cup 149 and tiller 125, respectively. At least an upper portion of the spring 145 can be positioned around the central post 151 of the tiller 125 and at least a lower portion of the spring 145 can be positioned around the central post 149 of the tiller cup 140. The spring 145 can be generally planar on its upper and lower surfaces such that it has a generally rectangular or square cross-section (see FIG. 5D). The spring 145 can have an upper planar surface 147 that can abut a lower surface of the tiller 125 as shown in FIG. 5B and a lower planar surface 148 that can abut an upper surface of the tiller cup 140 such that the spring 145 is positioned between them. Further, one or more snaps 152 on the spring 145 can engage a lower end of the post 151 on the underside of the tiller 125 such that the spring 145 is coupled to the underside of the tiller 125 (see FIG. 5C). The central post 151 of the tiller 125 can have a stop 111 and the central post 149 of the tiller cup 140 can have a stop 150. The spring 145 can include holes 153 extending through the opposing ends 146, for example, in case a user desires to place the spring 145 on the tiller 125 using a tool 143 such as needle-nose pliers (see, for example, FIG. 5E). The tool 143 can be used to spread the opposing ends 146 away from one another increasing the inner diameter of the spring 145 such that the spring 145 can be placed over the post 151.

Figure 7A:
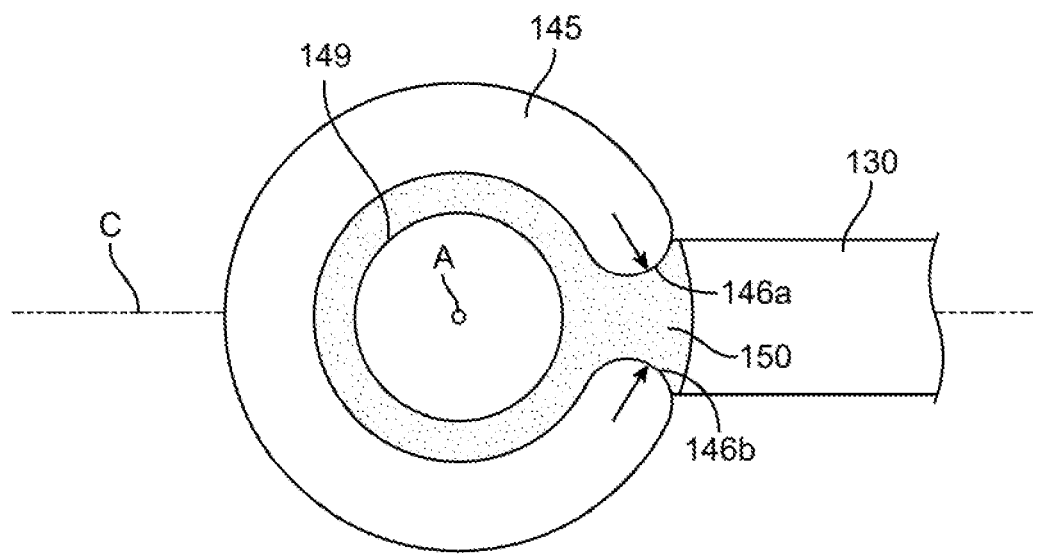
FIGS. 7A-7B are schematic views of a spring in a tiller.
Figure 7B:
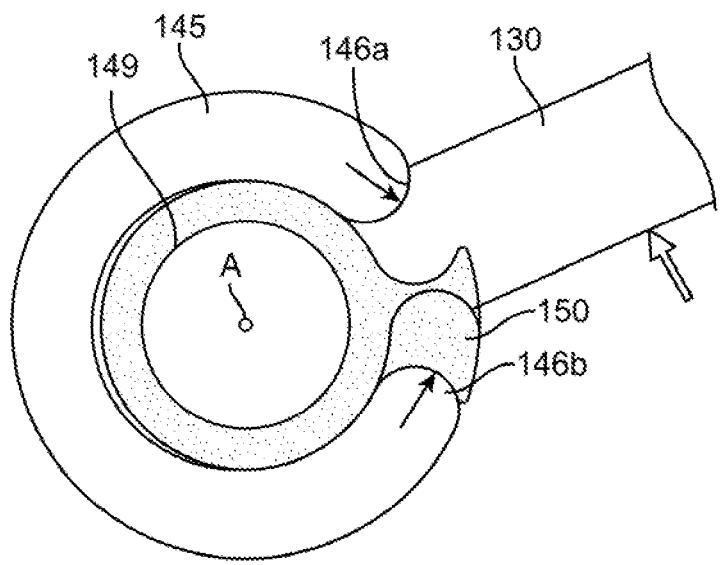
Figure 8A:
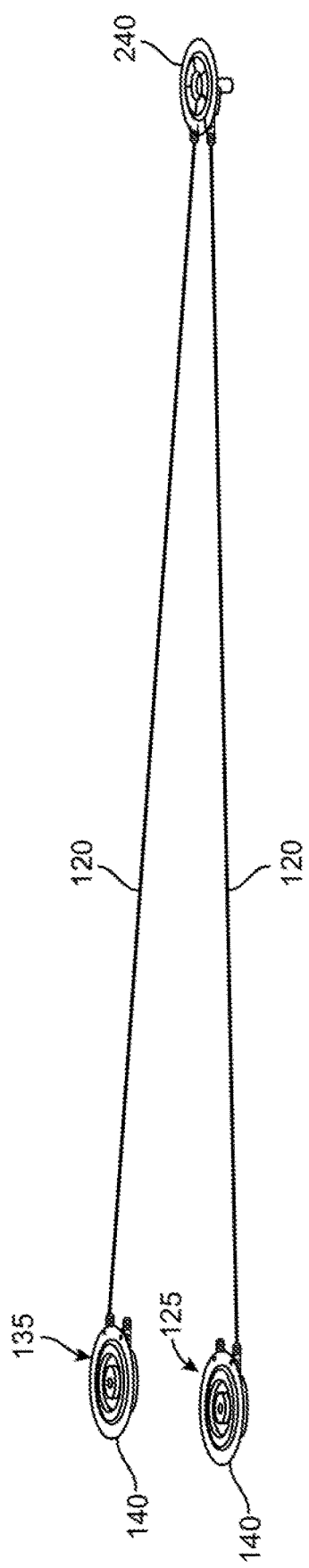
FIG. 8A is a perspective view of a portion of the steering system.
Figure 8B:
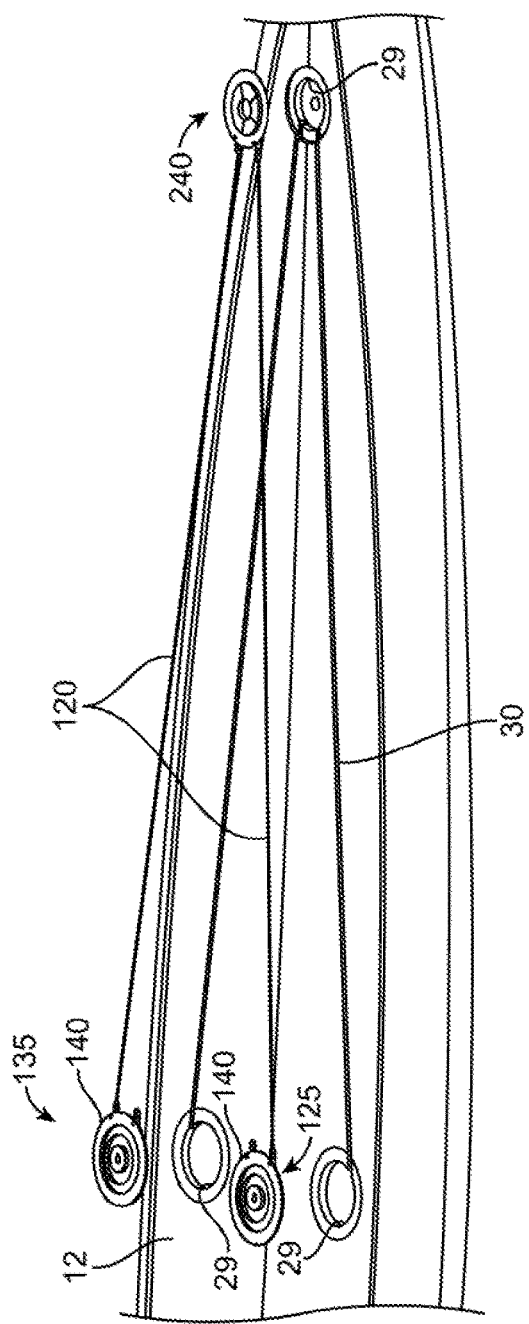
FIGS. 8B, 8C, 8D, and 8E are various views of the steering system and the board.
Figure 8C:
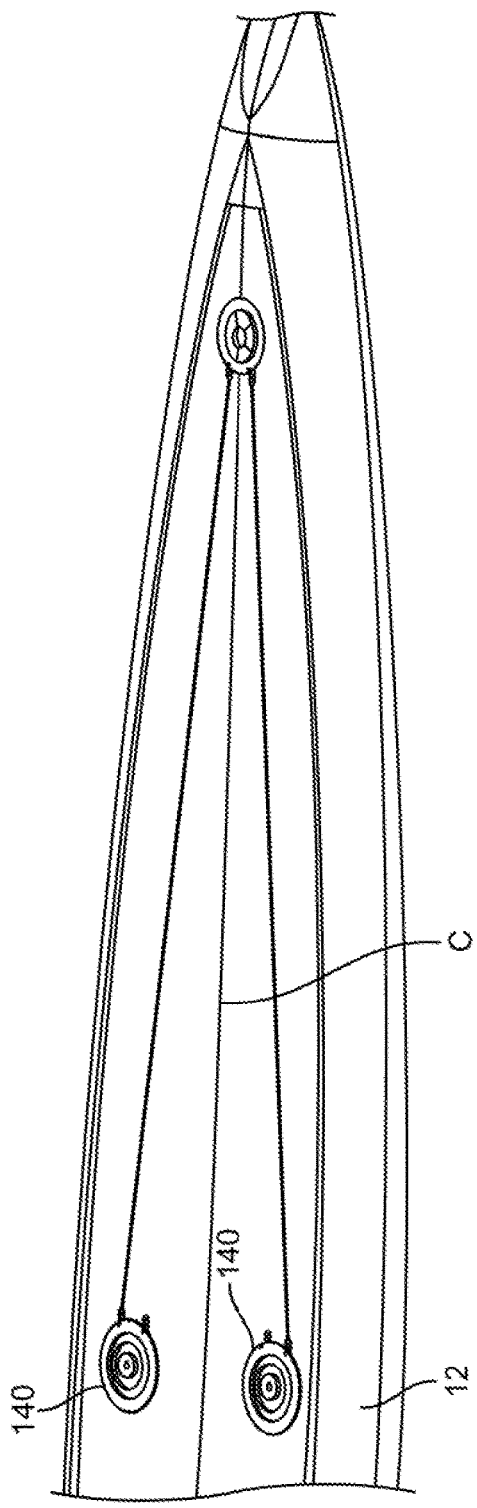
Figure 8D:
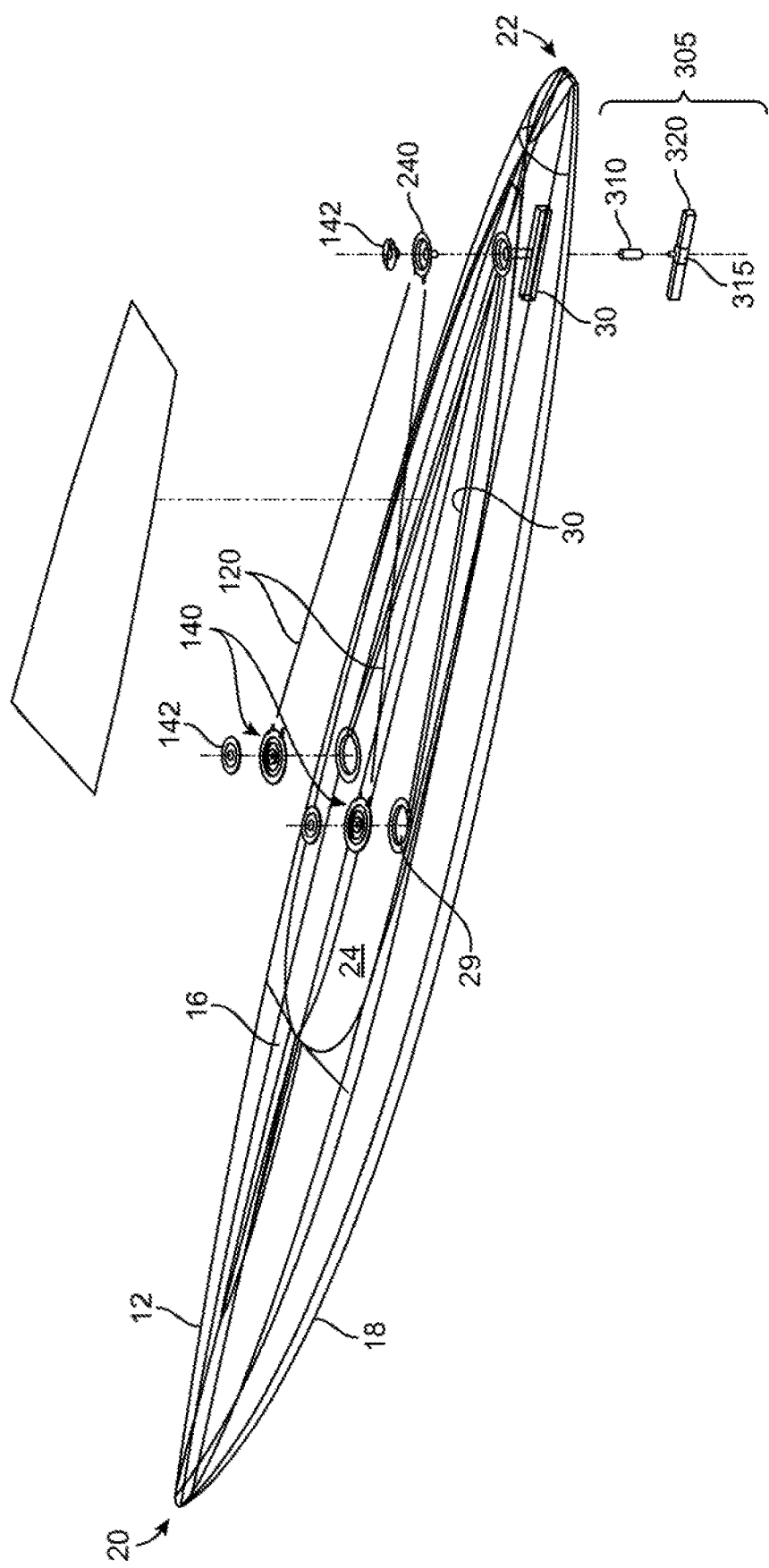
Figure 8E:
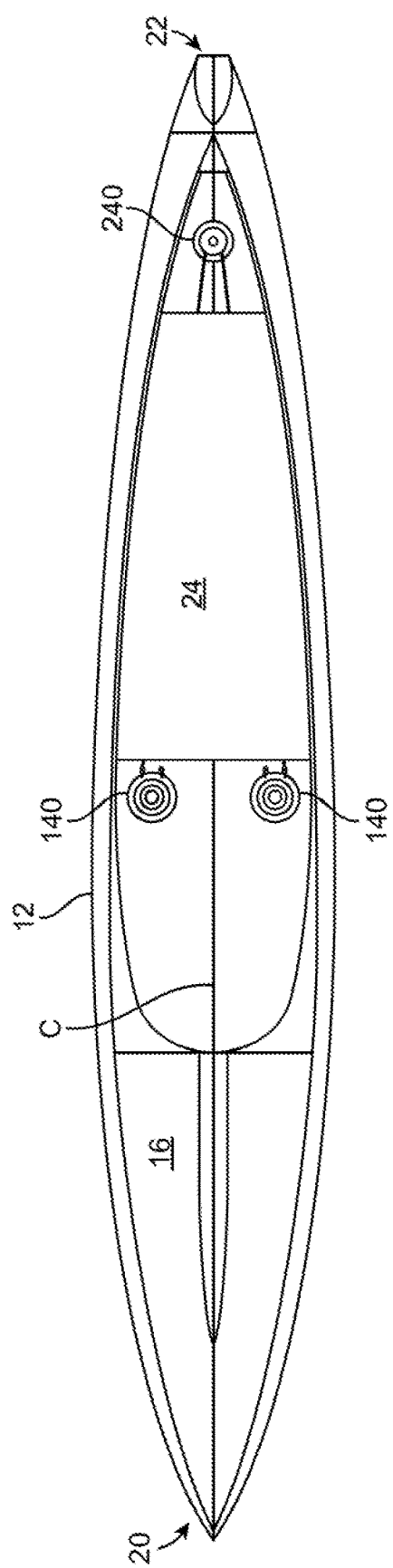

FIGS. 7A and 7B illustrate the deformation of the spring 145 as the tiller arm 130 rotates around the rotational axis A. When the spring 145 is positioned around the posts 149, 151 such that the lower planar surface 148 is positioned in contact with the tiller cup 140 and the upper planar surface 147 is positioned in contact with the tiller 125, the opposing ends 146 of the spring 145 can be positioned on either side of the stops 111, 150. The tiller cup 140 and thus, the post 149 and stop 150 of the tiller cup 140 remain fixed relative to the board 12 such that they do not rotate. Thus, as the tiller arm 130 rotates around the rotational axis A, the first opposing end 146a of the c-shaped spring 145 abuts the stop 111 of the rotating tiller 125 and the second opposing end 146b of the c-shaped spring 145 abuts the stop 150 of the tiller cup 140 remaining in place. This can cause deformation and/or outward movement of the spring 145. The tiller 125 can urge the first opposing end 146a of the spring 145 to move away from the second opposing end 146b of the spring 145. Upon release of the forces on the tiller arm 130, the first opposing end 146a can return back to its original position shown in FIG. 7A.

The spring 145 ensures the tiller system 105 and thus, the rudder system 115 are registered on a zero axis to ensure the rudder 170 is coincident to the center line C of the board 12 (e.g. along a zero axis) when no forces are being applied to the tiller 125. The tiller system 105 can be configured such that it can be locked at a desired angle less than or greater than zero, in order to compensate for external forces such as a cross wind, current or otherwise.

As described above and again with respect to FIGS. 2A-2C, the steering system 14 can also include a push rod system 110. The push rod system 110 provides a link between the tiller system 105 and the rudder system 115. The push rod system 110 can include one or more push rods 120 extending at least in part through respective conduits 160 that can mechanically link movement of the tiller arm 130 of the tiller system 105 to the rudder 170 of the rudder system 115. Each push rod 120 can be a solid material that allows the push and pull effect from tiller 125 to rudder 170 and can provide a superior durability over a traditional cable system. Such push and pull effect cannot be achieved by a traditional braided or wound cable. Each push rod 120 provides a synchronous link between the tiller 125 and the rudder 170.

The push rod 120 can be secured at one end to a region of the tiller cup 140 and at an opposite end to a region of the rudder cup 240, which will be described in more detail below. The push rod 120 can be secured within the tiller cup 140 (and also the rudder cup 240) by way of a push rod stopper 162 or other compression mechanism (see FIGS. 6A-6E). The tiller cup 140 can have at least a first conduit connection tube 172 configured to receive the push rod 120 of the push rod system 110. The conduit connection tube 172 can extend from a side region of the tiller cup 140 such that upon installation of the tiller cup 140 the tube 172 faces towards the stern 22 of the board 12. The conduit connection tube 172 can include a bore 174 extending through it from a threaded end region 176. The conduit 160 can slide over and terminate with the conduit connection tube 172. The coupling between the conduit 160 and the conduit connection tube 172 can be sealed such as by glue and/or shrink wrap tape. The unused connection tube 172 can also be sealed off to prevent water intrusion into the tiller cup 140 or into the interior of the board 12 itself. The push rod 120 can then move freely within the conduit 160 and pass into the internal region 177 of the tiller cup 140 without allowing any water intrusion into the interior of the board 12. At least a portion of the push rod 120 extends through the bore 174 of the conduit connection tube 172 into the internal region 177 of the tiller cup 140. The push rod 120 can couple with the push rod stopper 162 located within the internal region 177 of the tiller cup 140.

Figure 6A:
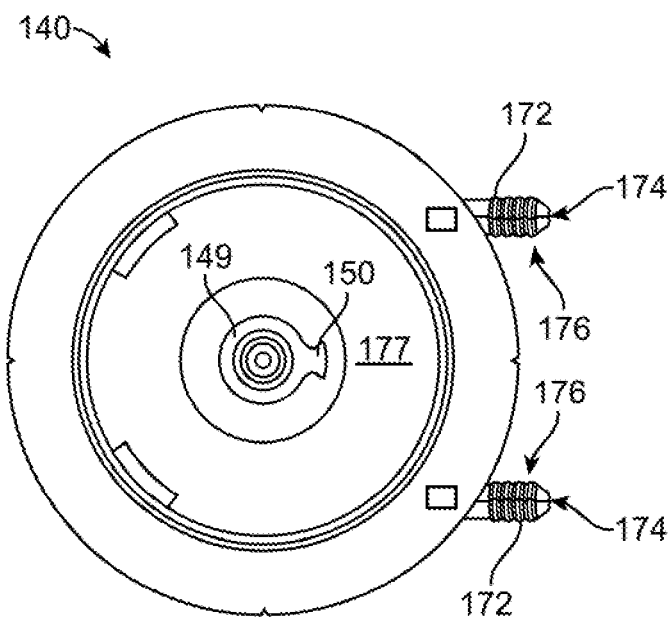
FIGS. 6A-6B are views of a tiller cup.
Figure 6B:
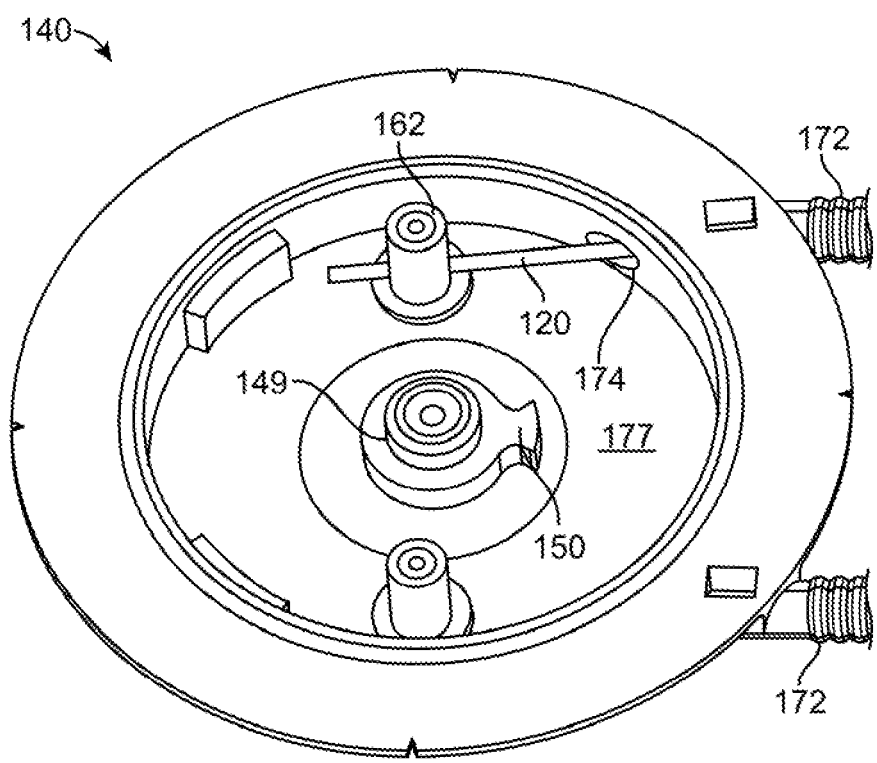
Figure 6C:
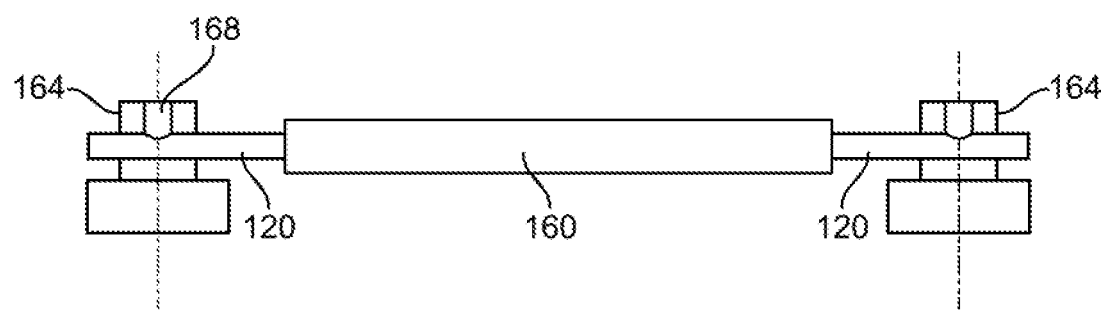
FIG. 6C is a schematic view of a push rod coupled to push rod stoppers.
Figure 6D:
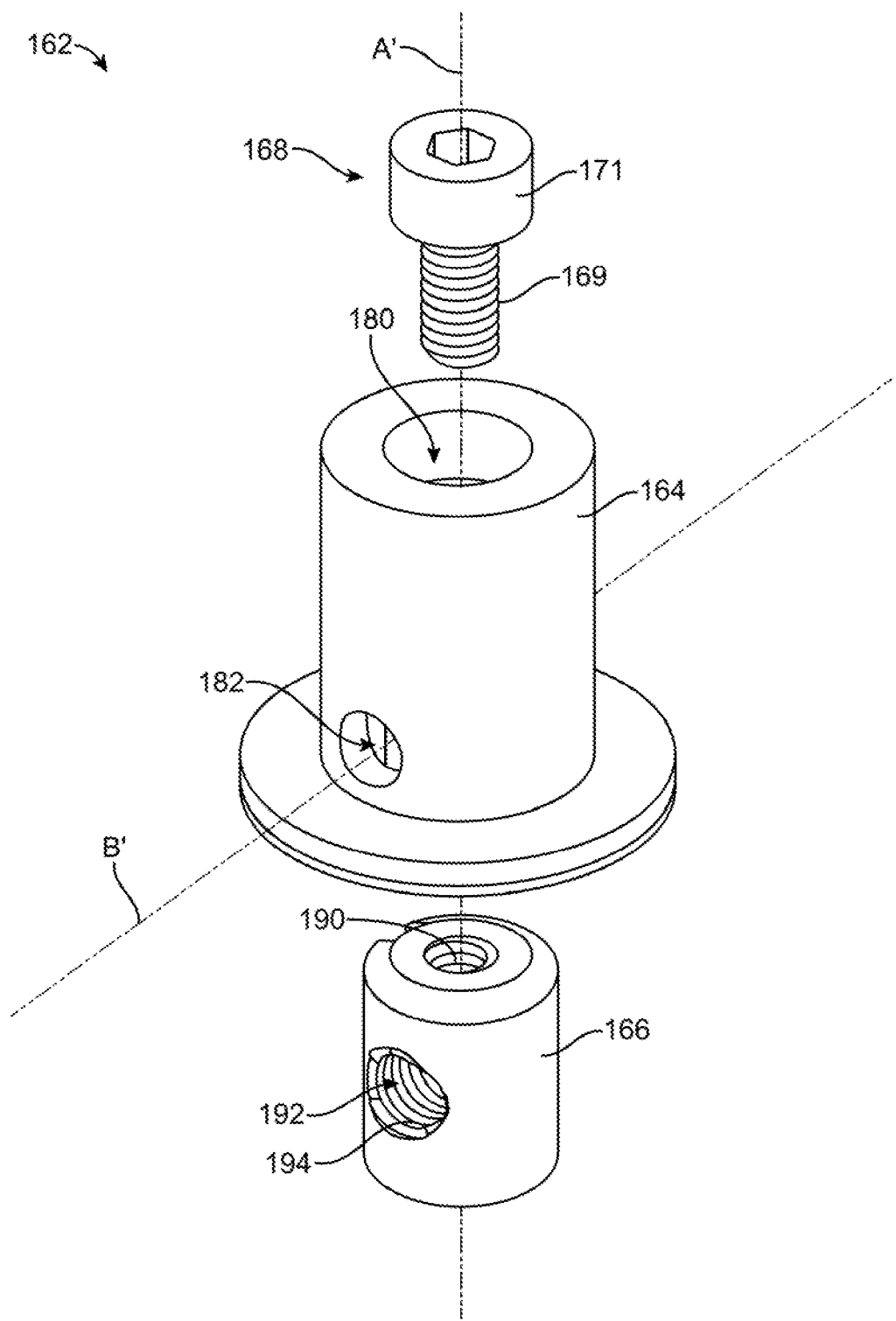
FIG. 6D is an exploded view of a push rod stopper.

As best shown in FIG. 6D, the push rod stopper 162 can include a case 164, a core 166, and a screw 168. The case 164 of the push rod stopper 162 can include an end bore 180 and a side bore 182. The end bore 180 can extend along a first axis A' from a top end of the case 164 towards a bottom end of the case 164. The side bore 182 can extend along a second axis B' from a first side of the case 164 through a second side of the case 164. The first and second axes intersect, for example such that they are perpendicular to one another. The core 166 of the push rod stopper 162 can also include an end bore 190 and a side bore 192. The end bore 190 of the core 166 can extend along the first axis A' from a top end of the core 166 towards a bottom end of the core 166. The side bore 192 of the core 166 can extend along the second axis B' from a first side of the core 166 through a second side of the core 166. As such the end bore 190 and the side bore 192 of the core 166 also intersect. The core 166 can insert through the end bore 180 of the case 164 such that the side bore 192 of the core 166 aligns coaxially with the side bore 182 of the case 164 along the second axis B'. The second axis B' of the side bores 182, 192 can also extend coaxially with the bore 174 of the conduit connection tube 172 such that an end 179 of the push rod 120 can insert through both side bores 182, 192 of the case 164 and the core 166 of the push rod stopper 162 (see FIGS. 6C and 6D).

The end bore 182 of the case 164 and also the end bore 192 of the core 166 coaxially aligned with the end bore 182 of the case 164 can be sized to receive a threaded shaft 169 of the screw 168. The threaded shaft 169 of the screw 168 can be inserted from a top end of the case 164 such that the threaded shaft 169 can engage with threads 194 of the end bore 192. The screw 168 can also include a socket cap 171 such that the screw 168 can be rotated within the end bore 180 of the case 164 such that the threaded shaft 169 and the threads 194 engage and the screw 168 is further advanced through end bore 190. FIG. 6D shows the end bores 180, 190 and the side bores 182, 192 extending orthogonal to the end bores 180, 190. The side bores 182, 192 can receive an end of the push rod 120 such that the push rod 120 extends through the side bores 182, 192 and crosses the end bores 180, 190 extending orthogonal to the side bores 182, 192. As mentioned above, end bore 190 and side bore 192 can intersect such that as the screw 168 advanced through end bore 190 it can penetrate side bore 192 through which the push rod 120 extends. With further tightening of screw 168, a distal end of the threaded shaft 169 can come into contact with an end region of the push rod 120 inserted through the rod stopper 162, for example to lock down the push rod 120 to prevent its movement within the side bores 182, 192 of the case 164 and core 166 of the push rod stopper 162.

The tiller cup 140 can have more than one conduit connection tube 172, for example one conduit connection tube 172a on the left of the stop 150 and one conduit connection tube 172b on the right of the stop 150 as shown in FIG. 6A. This configuration can provide for optional steering configurations. For example, connecting the push rod 120 on the right or left side of the tiller cup 140 and tiller 125 can determine in which direction the rudder 170 moves when the tiller arm 130 is actuated. As shown in FIG. 2A, where the push rod 120 is shown mounted to an inside of the tiller 125 via the conduit connection tube 172, the push rod 120 will move the rudder 170 a first direction upon movement of the tiller arm 130 to the left. As shown in FIG. 2C, where the push rod 120 is shown mounted to an outside of the tiller 125 via the conduit connection tube 172, the push rod 120 will move the rudder 170 in a different direction upon the same movement of the tiller arm 130 to the left. The push rod 120 will invert the effects and orientation when the tiller arm 130 is actuated in the same manner.

As mentioned above, the tiller arm 130 can be installed on either or both sides of the center C of the board 12. The side or position of the tiller arm 130 can also be adjusted or changed. In an implementation, an tiller 125 and tiller arm 130 can be installed on both sides of the board 12 and the screw 168 adjusted to change active steering of the tiller arm 130 on one side to the other. The screw 168 can be tightened down in the push rod stopper 162 on one side of the board 12 to engage and secure the push rod 120 within that push rod stopper 162 and the screw 168 on any other push rod stoppers 162 can be loosened. Steering can be available on multiple positions by using one or more tiller arm system assemblies and engaging the push rods 120 via the push rod stoppers 162 and set screws 168 on both tiller arm systems 105 and at both locations in the rudder system 115.

The one or more push rods 120 can be generally inserted into, extending through, and/or contained within respective channels 31 or conduits 160 of the push rod system 110. The conduits 160 can be recessed within channels 31 in the board 12 and can allow for the one or more push rods 120 to move freely through the conduits 160 upon actuation of the tiller system 105 while providing protection against damage. For example, the conduits 160 can mitigate infiltration of water or foreign and undesirable foreign particles and bodies to the one or more push rods 120. This configuration also can maintain the function of the push rods 120 from being impaired or compromised by the operator's presence. The conduit 160 can be a tubular element through which at least a portion of the push rod(s) extends. The conduit 160 can connect the rudder cups and the tiller cups allowing the push rods 120 to move freely within it. The conduit 160 can provide a watertight seal. Water can flow in and out of the cups 140, 240 or conduit 160, but cannot infiltrate the interior of the board 12 itself. The conduit 160 need not be a separate component and can also include a channel 31 recessed or plumbed into the board such that the push rod(s) extend through an interior of the recess 31. Further, it should be appreciated that the push rods 120 need not extend through an interior of the board 12. For example, the push rods 120 can extend from the tiller system 105 to the rudder system 115 on an exterior of the board 12. If the push rods 120 are installed externally without a conduit to connect the tiller and the rudder cups, the board 12 can be generally sealed and watertight. An external element can be used on the exterior of the board 12 to perform a similar function as the conduit 160.

As shown in FIG. 8A-8E, the conduits 160 can be installed generally internally or below one or more surfaces, such as the top surface 16 or an upper layer, of the board 12. In some implementations the conduit 160 can be a tube or a channel 31 formed through the interior of the board 12 and covered by materials such as but not limited to fiberglass, carbon fiber, wood, PVC and EVA layers. Alternatively, the conduit 160 can be installed externally. The tiller cups 140 and tiller system 105 (as well as rudder cups 240 and of the rudder system 115) can reside within a recess 29 formed in the board 12 having a corresponding size and shape to receive a tiller cup 140 or a rudder cup 240. In some implementations, the cups can be recessed within the board 12 such that the tiller arm 130 remains generally parallel to the deck region 24 of the board 12. The conduit connection tube 172 of the tiller cup 140 and rudder cup 240 can be oriented and aligned in such a way to receive the conduits 160. The push rod 120 can insert through the conduit 160 and enter the interior of the tiller cup 177 and rudder cup 240. The push rod 120 can couple with the push rod stopper 162 on either side or both sides to effectuate a synchronous connection between the tiller system 105 and rudder system 115. The conduit 160 and/or push rod 120 can also be installed on the exterior of the board 12. It should be appreciated that use of the conduit 160 is optional in that the push rod 120 can be used to connect the tiller system 105 and rudder system 115 without the conduit 160, for example on the exterior of the board 12, while achieving the same connectivity synchronous movement between the tiller 130 and the tiller system 105 and rudder system 115.

The push rods 120 and/or conduits 160 if included of the push rod system 110 can be formed of a variety of materials. In some implementations, the push rods 120 can be formed of fiberglass or a form of plastic. The conduits 160 can be formed of fiberglass or a form of plastic similarly or the same as the push rods 120. The push rods 120 can have an outer diameter that corresponds with the inner diameter of the conduit 160 such that the conduits 160 through which the push rods 120 extend can have a tolerance that allows free movement of the push rod 120 and in such a way that sagging of the push rod 120 within the conduit 160 is avoided. In some implementations, one or more spacing rings can be added along the length of the push rod 120. The one or more spacing rings can have an outer diameter that approaches the inner diameter of the conduit 160 to reduce sagging and promote free movement of the push rod 120 within the conduit 160. The push rods 120 can also be coated to smooth movement of the rods 120 within the conduits 160 or to lessen the sounds of the rods 120 moving within the conduits 160.

Figure 9:
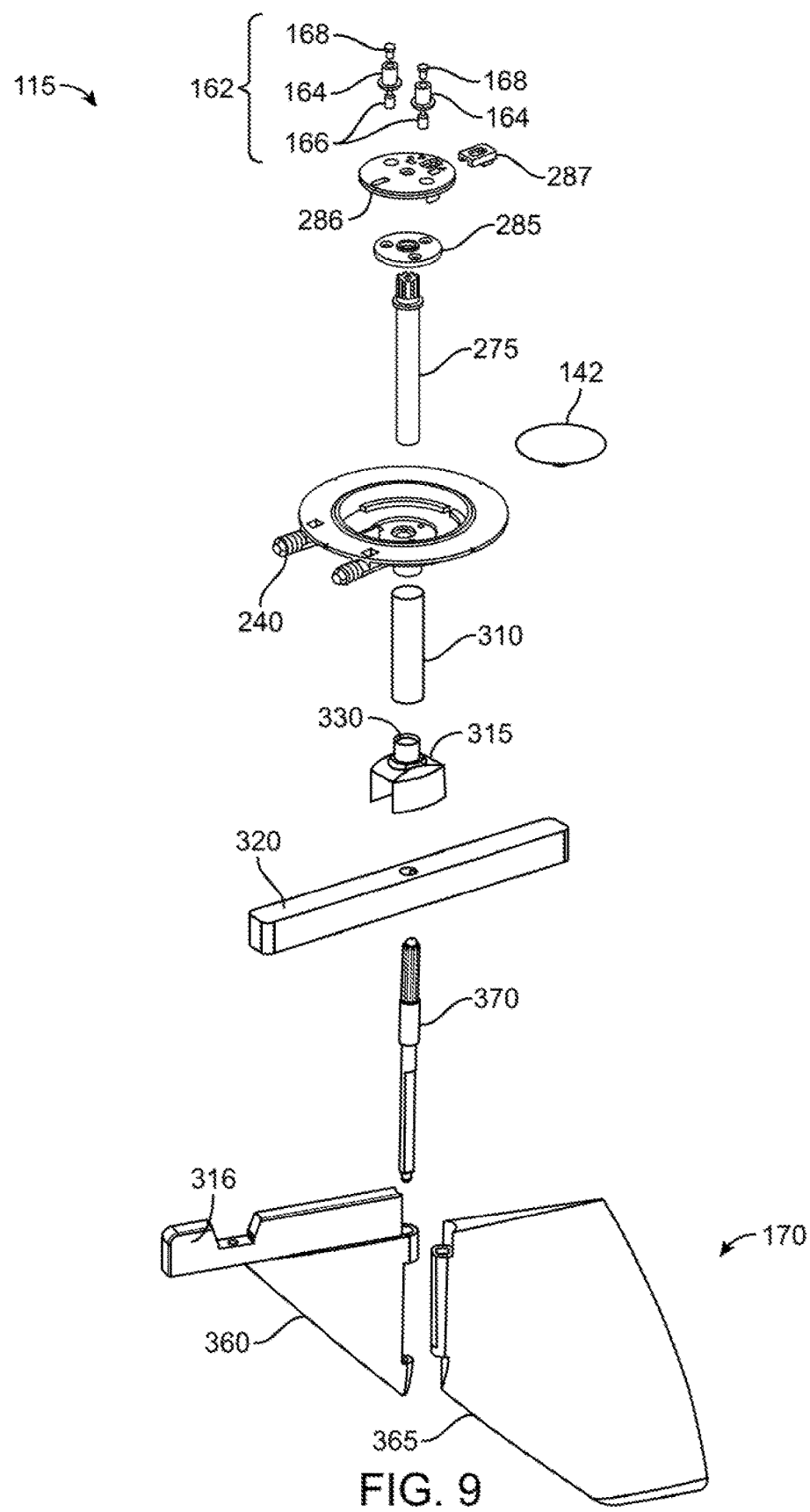
FIG. 9 is an exploded view of the rudder system.

The push rod 120 can be coupled to the tiller system 105, as described above at a first end region, and extend through the conduit 160 to couple at a second end region with the rudder system 115. As best shown in FIG. 9 and also FIGS. 10A-10B, the rudder system 115 can include a rudder cup 240 having one or more conduit connection tubes 272 similarly to the tiller cup 140 for optional steering configurations. For example, connecting the push rod 120 on the right or left side of the rudder cup 240 can determine in which direction the rudder 170 moves when the tiller arm 130 is actuated. Where the push rod 120 is shown mounted to a conduit connection tube 272 on a side of the rudder cup 240 to the right of center, the push rod 120 will move the rudder 170 a first direction upon movement of the tiller arm 130 to the left. Where the push rod 120 is mounted to a conduit connection tube 272 on a side of the rudder cup 240 to the left of center, the push rod 120 will move the rudder 170 in a different direction upon the same movement of the tiller arm 130 to the left. The push rod 120 can invert the effects and orientation when the tiller arm 130 is actuated in the same manner. The conduit 160 can slide over and terminate with the conduit connection tube 272 and their coupling can be sealed such as by glue and/or shrink wrap tape. The unused connection tube 172 can also be sealed off to prevent water intrusion into the rubber cup 240 or into the interior of the board 12 itself. The push rod 120 can then move freely within the conduit 160 and pass into the internal region 277 of the tiller cup 140 without allowing any water intrusion into the interior of the board 12.

Again with respect to FIGS. 9 and 10A-10B and similarly to how the push rods 120 can be secured to the tiller system 105 as described above, the push rods 120 can be secured to the rudder system 115 by way of push rod stoppers 162 or other compression mechanism. The push rod stoppers 162 and push rods 120 provide a synchronous link between the tiller 125 and rudder 170. The rudder cup 240 can have first conduit connection tube 272 extending towards the bow end 20 of the board 12. The conduit connection tube 272 can include a bore 274 extending through it from a threaded end region 276 terminating into an internal region 277 of the rudder cup 240 such that at least a portion of the push rod 120 extends through the conduit connection tube 272 into the internal region 277. The push rod 120 extending through the bore 274 into the internal region 277 of the rudder cup 240 can couple with the push rod stopper 162 located within the internal region 277 of the rudder cup 240, as described above.

In an implementation, the steering system can include two push rods 120. A first push rod 120 can be coupled on a first end region to a push rod stopper 162 of the dummy cover 135 and on a second end region to a push rod stopper 162 of the rudder system 115. A second push rod 120 can be coupled on a first end region to a push rod stopper 162 of the tiller 125 and on a second end region to a second push rod stopper 162 of the rudder system 115 (see FIG. 2A-2C). Once each of the push rods 120 are aligned, the set screws 168 can be tightened down on one side or on both sides or on both sides of their respective push rod stoppers 162 so that desired components of the tiller system 105, the push rod system 110, and the rudder system 115 become coupled and act effectively one logical unit and operate in synchronicity. If one side or both sides of the tiller system 105 and rudder system is to be rendered inactive then the set screw 168 can be loosened or left untightened so as to uncouple the tiller system 105, the push rod system 110, and the rudder system 115 such that they do not the effectuate a synchronous connection between tiller system 105, the push rod system 110, and the rudder system 115. A first screw 168 can be advanced through the dummy tiller push rod stopper 162 until the first screw 168 penetrates side bore 192 through which the first end region of the first push rod 120 extends. A second screw 168 can be advanced through the rudder system push rod stopper 162 until it penetrates side bore 192 through which the second end region of the first push rod 120 extends. A third screw 168 can be advanced through the active tiller push rod stopper 162 until it penetrates side bore 192 through which the first end region of the second push rod 120 extends. A fourth screw 168 can be advanced through the second rudder system push rod stopper 162 until it penetrates side bore 192 through which the second end region of the second push rod 120 extends.

Figure 11C:
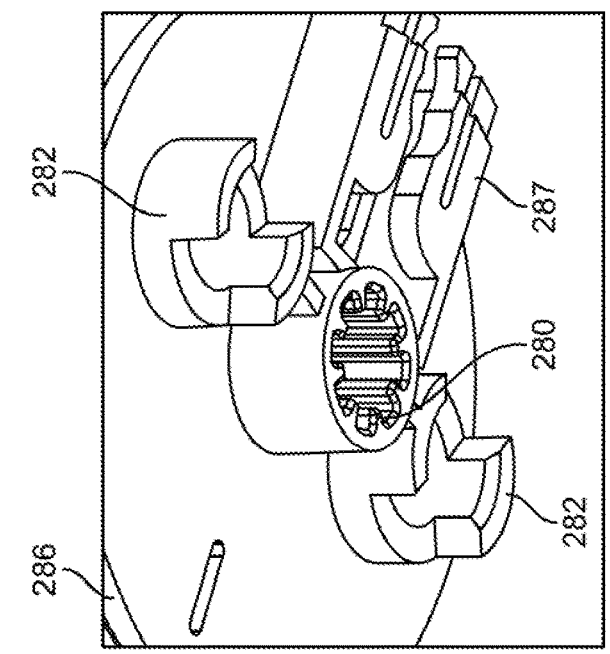
FIG. 11C is a partial perspective view of the rudder spool.
Figure 11B:
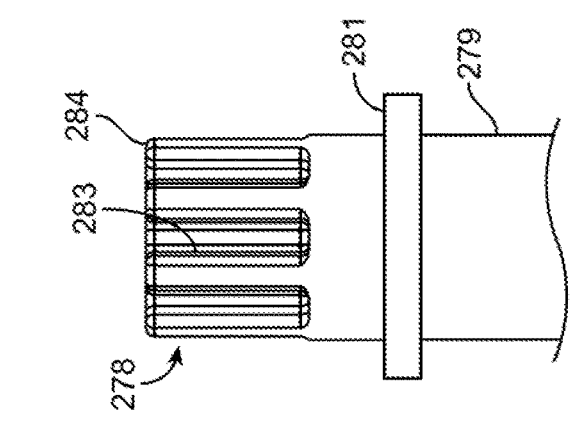
FIG. 11B is a partial side view of the rudder axis.

Again with respect to FIGS. 9 and 10A-10B, the rudder cup 240 can include a central bore 273 configured to receive a rudder axis 275. The rudder axis 275 can include a proximal head region 278 and a distal elongate shaft 279. The distal elongate shaft 279 of the rudder axis 275 can extend through the central bore 273 of the rudder cup 240 and the proximal head region 278 can be retained within the internal region 277 of the rudder cup 240, for example, due to the presence of a flange 281 having an outer diameter that is greater than an internal diameter of the central bore 273. The proximal head 278 can have teeth 283 formed in its outer surface (see FIG. 11B). The teeth 283 of the proximal head 278 can include a fillet or chamfer 284 on their proximal edges. A retainer washer 285 can be captured between an internal surface 277 of the rudder cup 240 and the head 278 of the rudder axis 275.

Figure 11A:
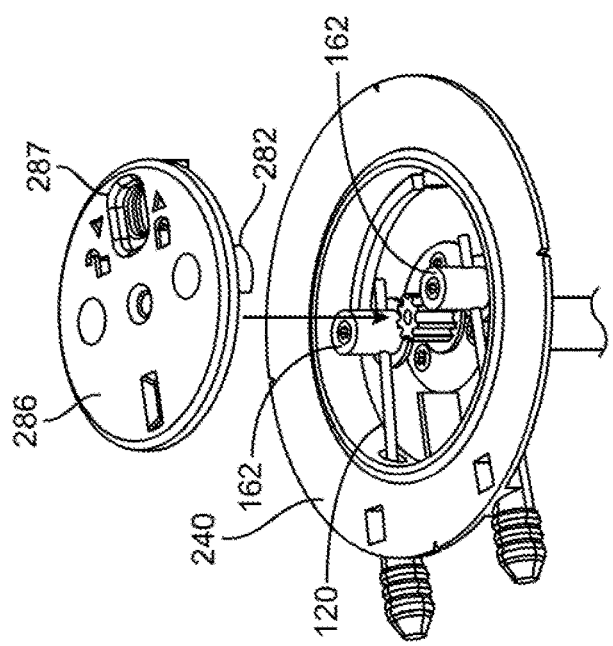
FIG. 11A is an exploded partial view of the rudder spool and the rudder cup.
Figure 11D:
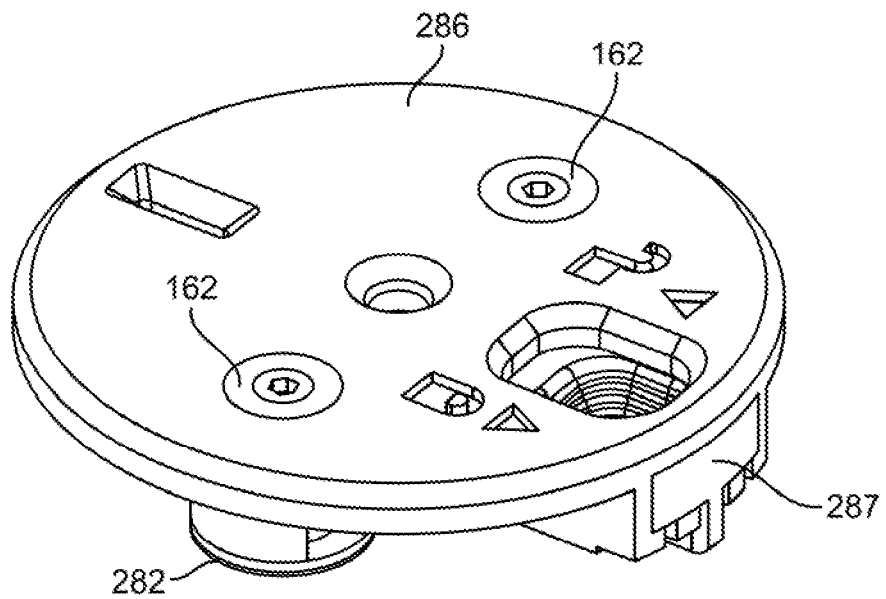
FIG. 11D is a perspective view of the rudder spool.
Figure 11E:
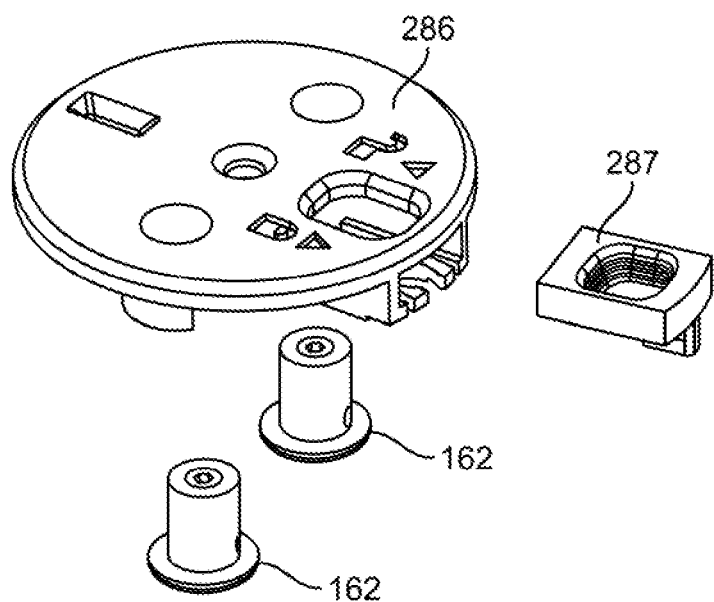
FIG. 11E is an exploded, perspective view of the rudder spool and the push rod stoppers.
Figure 11F:
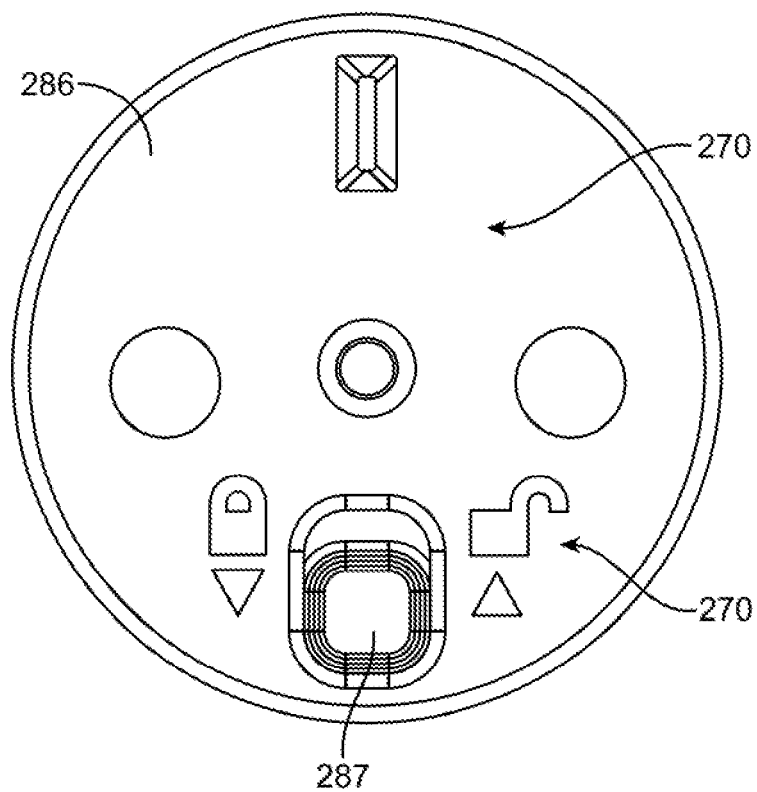
FIG. 11F is a top plan view of the rudder spool.

The head 278 can remain within the internal region 277 of the rudder cup 240 where it couples with a rudder spool 286 and the distal elongate shaft 279 can project out through the lower side of the rudder cup 240 where it can couple with a rudder post 370, as will be described in more detail below. The proximal head 278 of the rudder axis 275 can engage with a correspondingly shaped feature 280 on an underside of the rudder spool 286 (see FIGS. 11A-11C). The rudder spool 286 can also include features 282 on its underside that are sized and shaped to receive the rod stoppers 162 on either side of the proximal head 278. The rudder spool 286 can include a button 287 configured to lock and unlock the rudder 170. The button 287 can be a slideable element configured to engage with a portion of the rudder cup 240. The button 287 can slide into a locked position such that button 287 acts as a male component configured to engage with a female component, such as an indentation contained within the rudder cup 240. An upper surface of the rudder spool 286 can include visual indicators, for example graphics 270 to indicate lock and unlock of the rudder 170 via the lock button 287 as well as graphics to indicate alignment of the rudder spool 286 and the rudder 170 of the rudder system 115 with a front of the board 12 (see FIG. 11F).

Figure 12C:
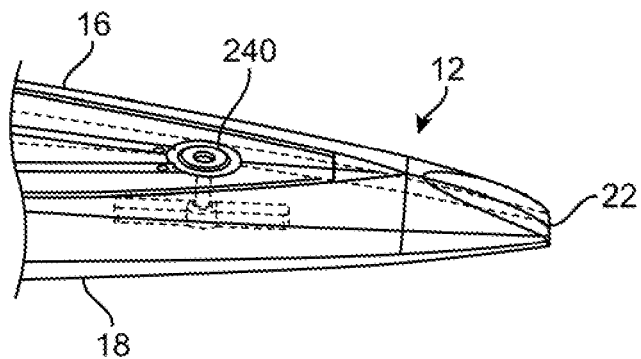
FIGS. 12C, 12D, 12E, 12F, 12G, and 12H are various views of the fin box set assembled with the board.
Figure 12D:
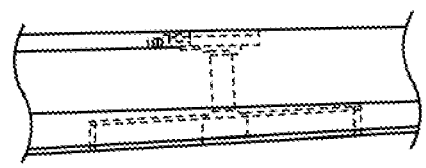
Figure 12E:
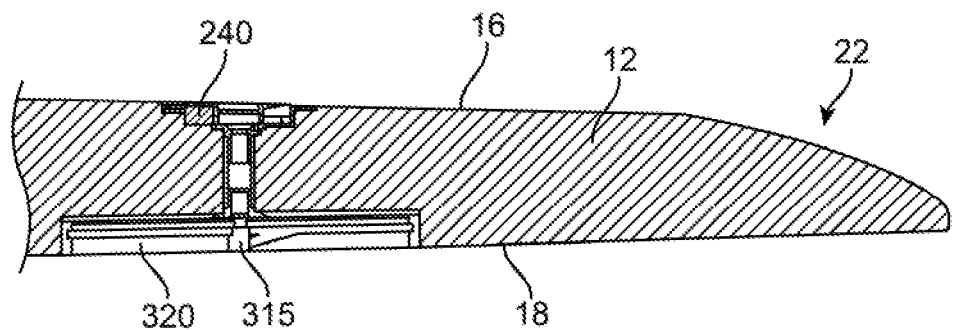
Figure 12F:
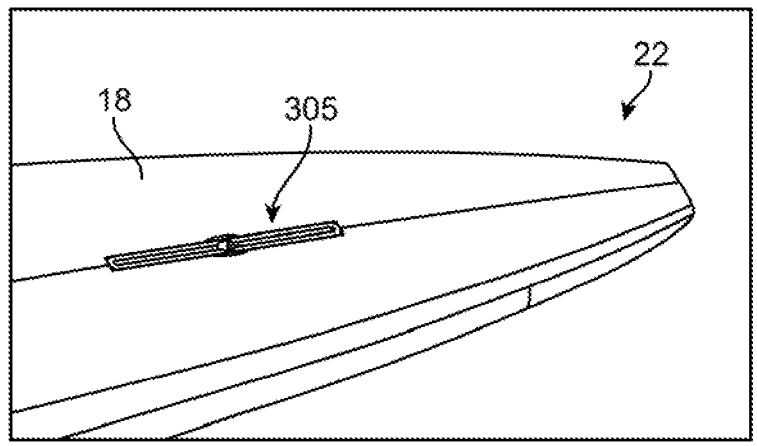
Figure 12G:
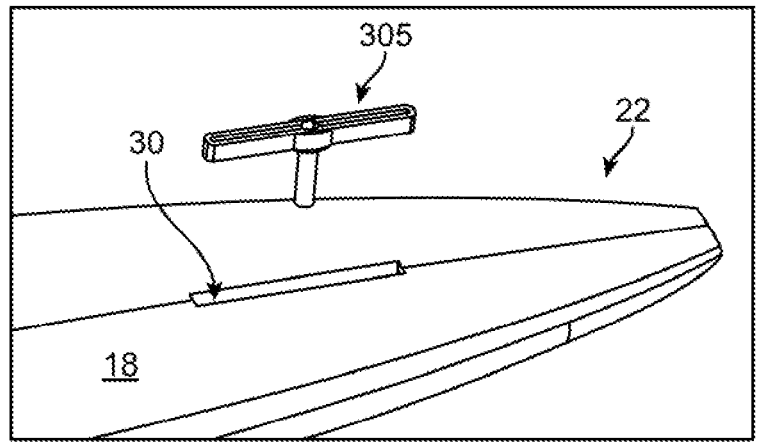
Figure 12H:
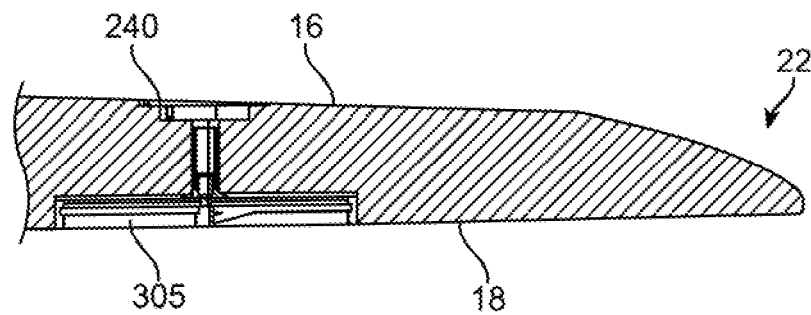

The rudder system 115 can further include a fin box set 305 configured to couple the rudder 170 in the bottom of the board 12 such that when the rudder system 115 is manipulated, the orientation of the rudder 170 can be changed to affect directional control over the board 12. As shown in FIG. 9, and also FIGS. 12A-12H, the fin box set 305 can include an axis cover 310, a fin box link 315, and a fin box 320. As shown in FIGS. 12F-12G, the fin box set 305 can fit within a fin box pocket 30 in the board 12 such that the fin box 315 lies generally flush with the bottom surface 18 of the board 12 and the rudder cup 240 lies generally flush with the top surface 16 of the board 12 (see FIG. 12F). The fin box 305 can be a standard U.S. fin box or similar fin box and include a fixed fin compatible with such a fin box. The rudder system 115 can be disabled and/or disassembled such that a U.S. Standard fin box compatible or similar fixed fin can be incorporated into the fin box 305

Figure 13:
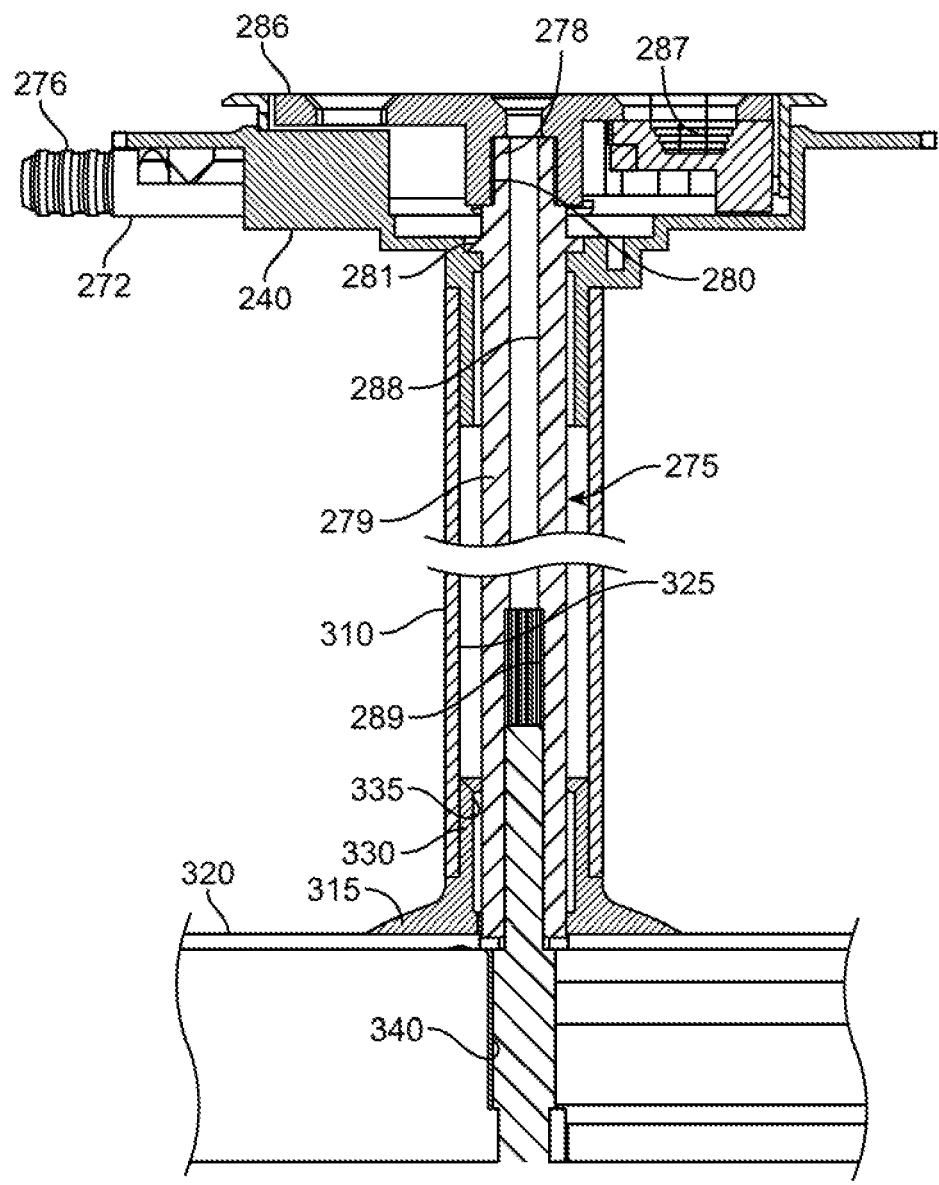
FIG. 13 is a cross-sectional view of the rudder system.
Figure 14A:
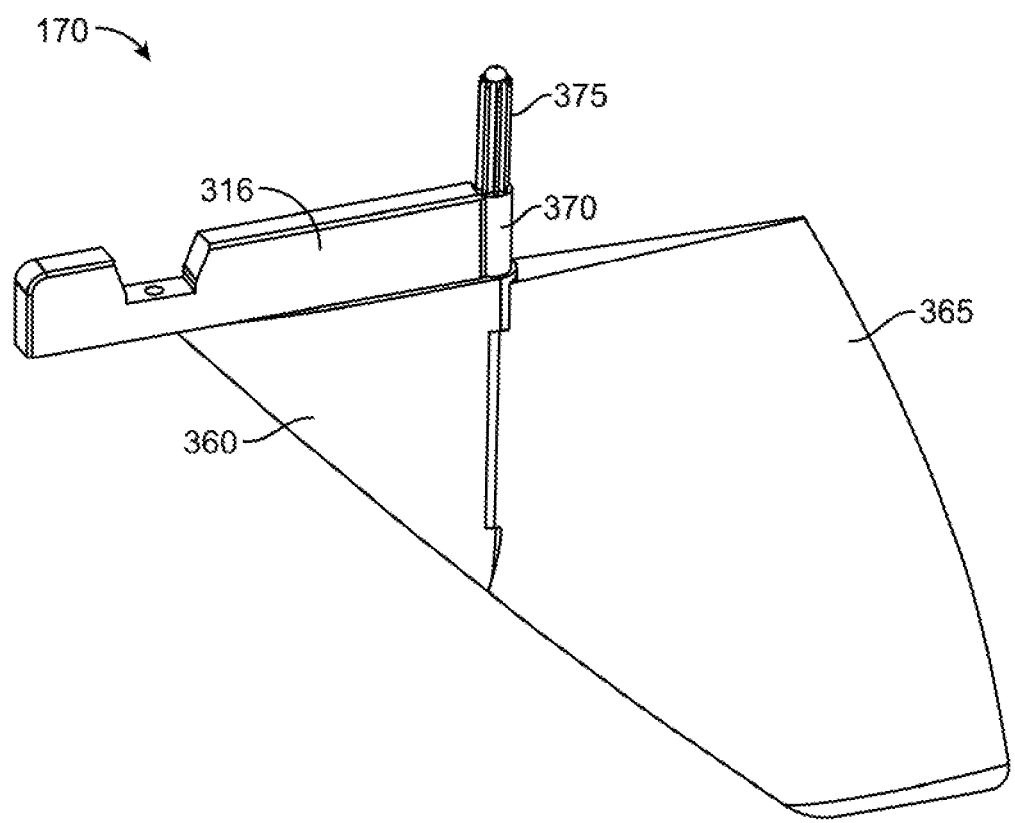
FIGS. 14A, 14B, 14C, 14D, and 14E are various views of an implementation of a rudder.
Figure 14B:
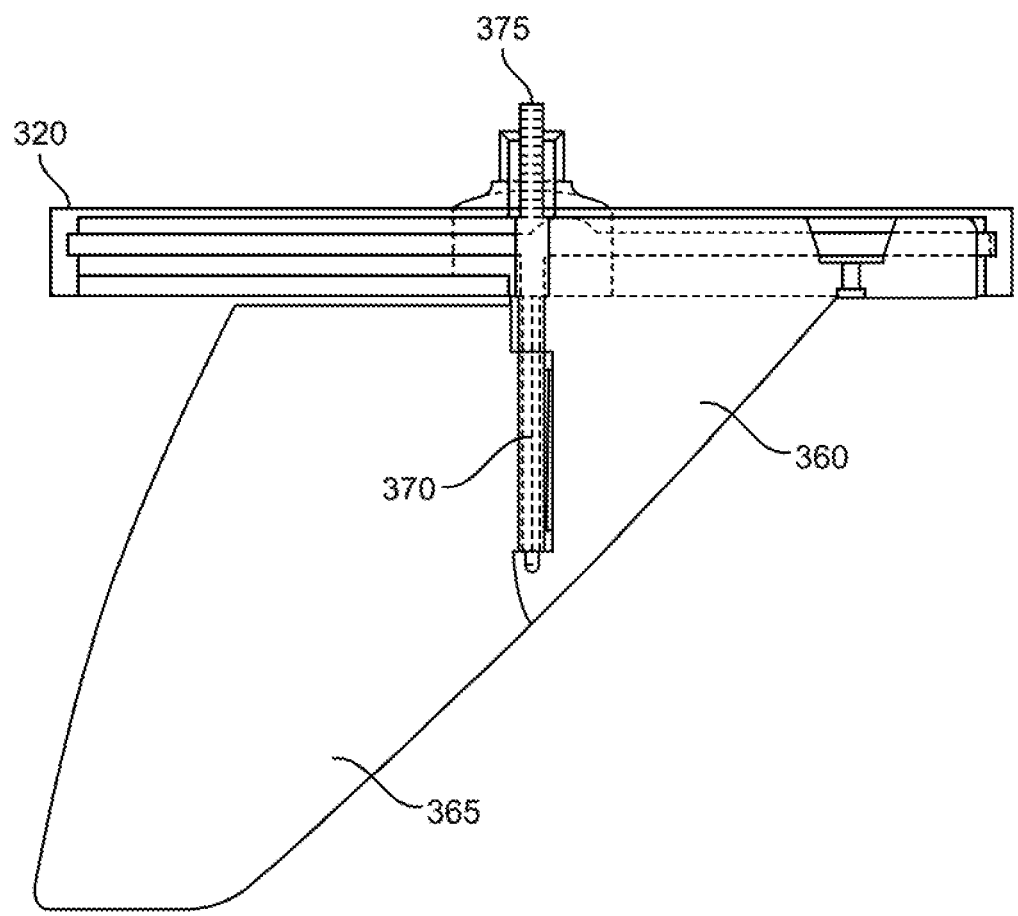
Figure 14C:
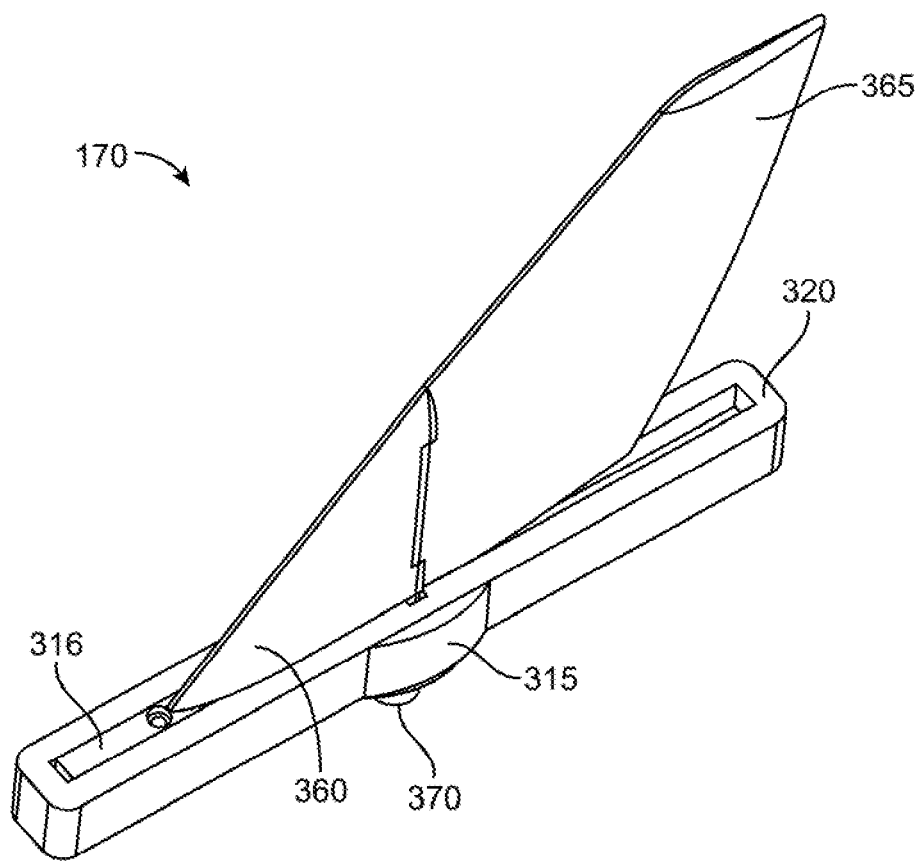
Figure 14D:
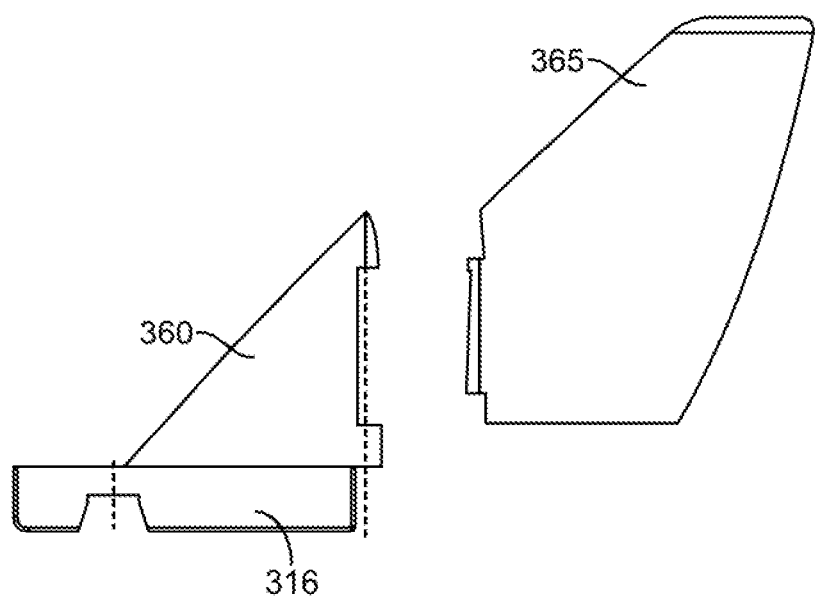
Figure 14E:
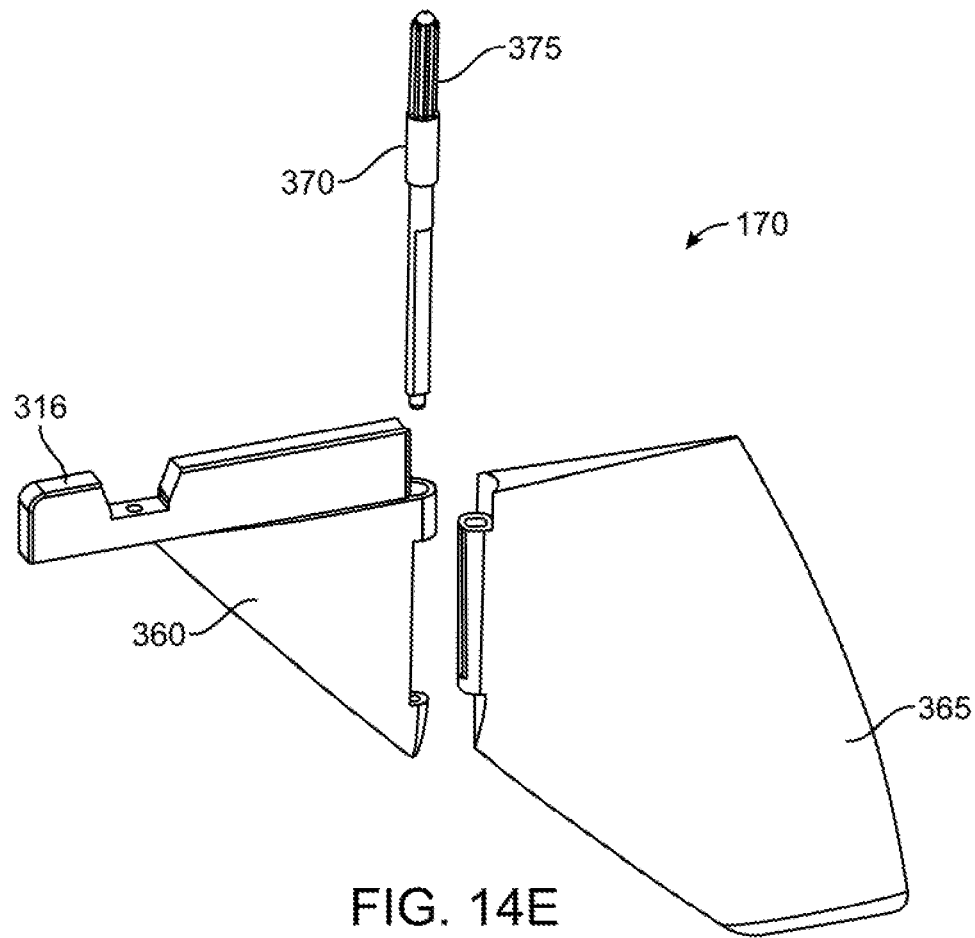
Figure 15A:
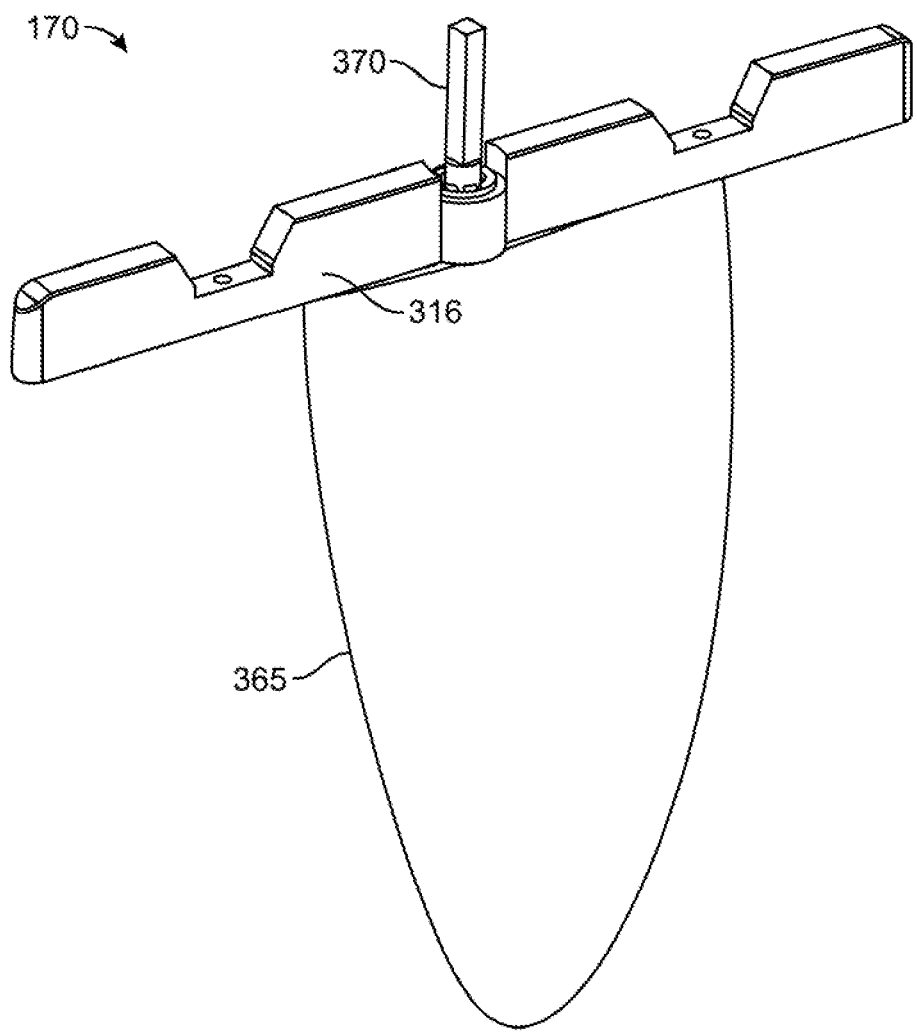
FIGS. 15A, 15B, 15C, and 15D are various view of another implementation of a rudder.
Figure 15D:
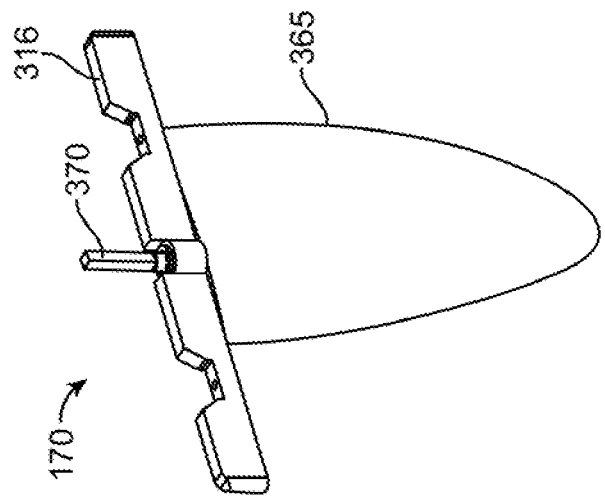
Figure 15C:
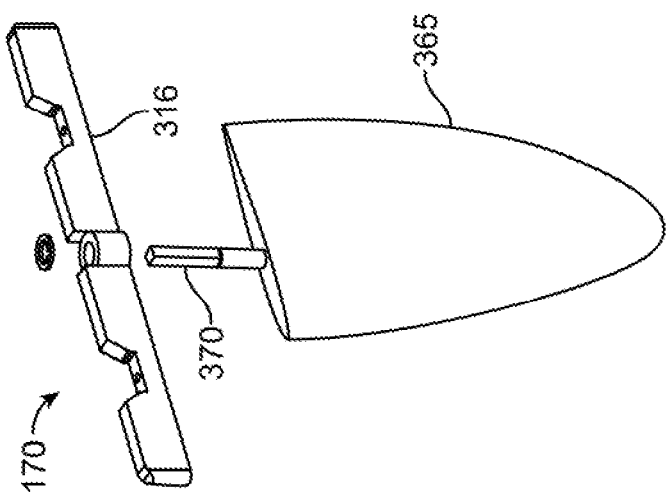
Figure 15B:
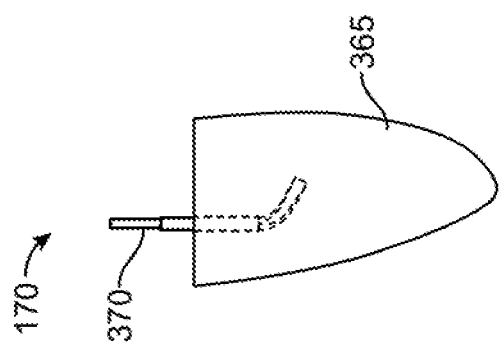

The rudder cup 240 can couple to a first end region of the fin box set 305 and the rudder 170 can couple to a second end region of the fin box set 305. The axis cover 310 of the fin box set 305 can be a cylindrical element configured to align coaxially with the central bore 273 of the rudder cup 240 such that rudder axis 175 extends through the bore 273 of the rudder cup 240 and into an inner lumen 325 of the axis cover 310. A first end region of the axis cover 310 can couple with a projection 330 extending from an underside of the rudder cup 240. A second end region of the axis cover 310 can couple with the fin box link 315 such that the inner lumen 325 of the axis cover 310 and the bore 335 of the fin box link 315 are coaxially aligned with each other and with a bore 340 through the fin box 320. The fin box link 315 can have a lower forked region 345 configured to engage with the fin box 315. The lower forked region 345 can have a first region 350 adjacent a first side of the fin box 315 and a second region 355 adjacent a second side of the fin box 315 such that the upper surface of the fin box 315 abuts an inner region between the first and second regions 350, 355 (see FIG. 12B). FIG. 13 shows a cross-sectional view of the rudder cup 240 having rudder axis 275 extending through the central bore 273 and the axis cover 310 and into the fin box link 315 of the fin box set 305.

The rudder 170 of the rudder system 115 can vary. In some implementations, the rudder 170 can be a single stand-alone rudder 365 design as shown in FIG. 15A-15D. In other implementations, the rudder 170 can have a pre-fin and rudder flap design such as that shown in FIGS. 14A-14E. The pre-fin and rudder flap components can be assembled in close proximity or connected by a hinge so as to enhance strength, facilitate clean water flow and maximize directional control. In some implementations, the rudder 170 can include a base 316 having a fixed pre-fin 360 coupled to a moveable rudder flap 365 by a rudder shaft 370 or the rudder 170 can include a base 316 with a single stand-alone rudder 365. The pre-fin 360 can be installed into the fin box 320 such that in the event that the rudder flap 365 fails, the pre-fin 360 can provide sufficient tracking to mitigate the board 12 from fish-tailing sideways. This can provide directional control over the board 12 even if the steering mechanism 14 is rendered inoperable or inadequate. Maintaining control over the tracking of the board 12 can enhance the ability of the board 12 to return to a safe destination. The shape of the pre-fin 360 and rudder flap 365 single stand-alone rudder 365 can vary to achieve various performance needs. In some implementations, the pre-fin 360 can be sloped and help to shed weeds (see FIG. 14A).

Figure 16A:
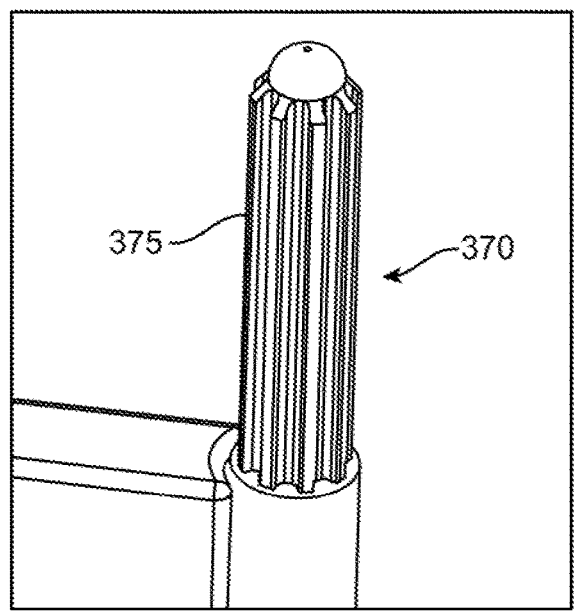
FIG. 16A is a perspective view of a rudder shaft.
Figure 16B:
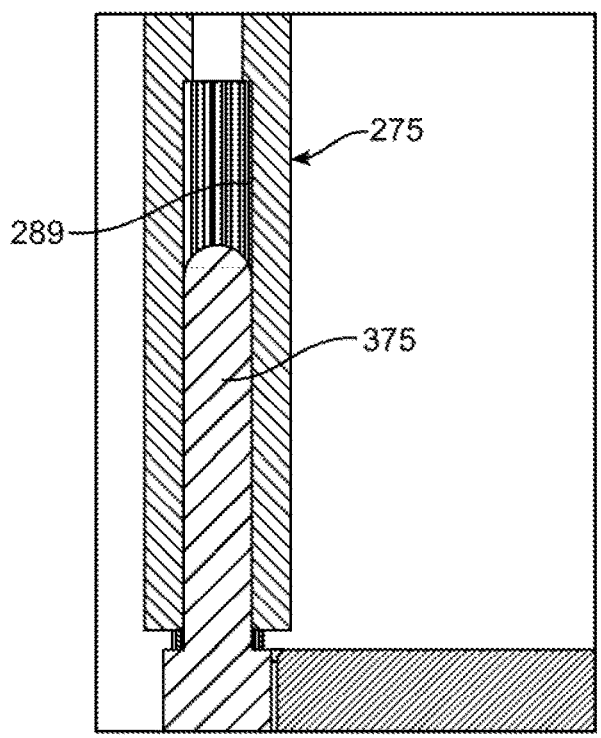
FIG. 16B is a cross-sectional view of the rudder shaft installed within a rudder axis.

At least a portion of the rudder shaft 370 can couple to the rudder axis 275 (see FIGS. 16A-16B). The rudder axis 275 can include an inner lumen 288 extending at least in part through a lower end of the rudder axis 275. The inner lumen 288 can be threaded forming a threaded region 289 (see FIG. 13 and FIG. 16B) configured to engage with correspondingly threaded region 375 of a rudder shaft 370 coupling the rudder 170 to the fin box 320 (see, e.g. FIG. 14E). The connection between the rudder shaft 370 and the rudder axis 275 can be a self-centering connection.

The form factor of the components of the steering system 14, including the tiller system 105, the push rod system 110 and the rudder system 115, can be generally low profile such that a user can stand on one or more parts of these systems such as on the tiller arm 130 and actuate the steering system 14 without significantly affecting the user's ability to use the paddle board (e.g. paddle). The tiller arm 130 although described herein as being actuated by a user such as with a foot or toe can also be designed such that it can be actuated by a user's hand. It should be appreciated the steering system 14 can be controlled using an electronic device such as a remote control and a servo or an alternative actuator device and/or mechanism. Such devices can affect control and movement of the steering system 14 such that when manipulated provides directional control over the board 12. The remote control can be worn by a person or incorporated into a paddle or the board 12. The control can include one or more features of that described in U.S. Publication no. 2013/0344758, which is incorporated by reference herein.

Figure 17A:
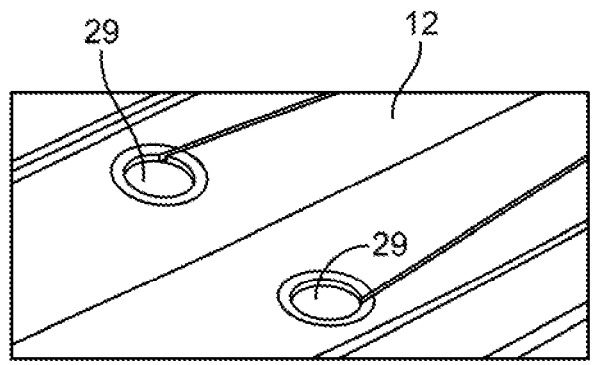
FIGS. 17A-17C show routered pockets, recesses, holes, and channels that can be formed into the board for receiving components of the steering system.
Figure 17B:
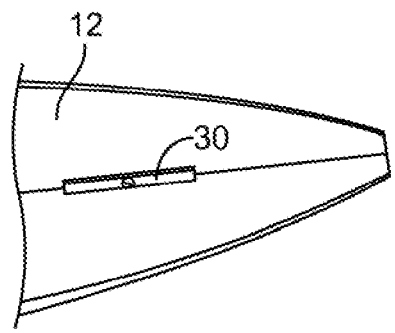
Figure 17C:
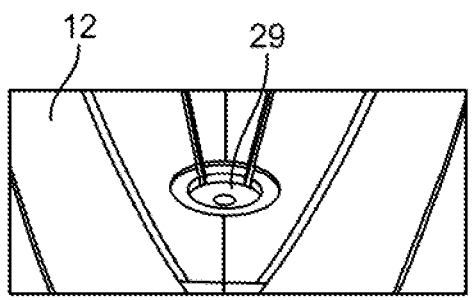

The board 12 can be pre-plumbed such that all the pockets 30, recesses 29, and channels 31 are routered into the board 12. For example, FIGS. 17A, 17B, and 17C show tiller cup and rudder cup holes 29 as well as a finbox pocket 30 routered into surfaces of the board 12. It should be appreciated that the steering system 14 can be removable after installation. The steering system 14 can also be plumbed for one or more tiller arms providing additional failover in the event that one side or one or more mechanisms fails to operate correctly.

The board 12 can be solid or at least partly hollow or hollow. The board 12 can be formed as a unitary, one-piece structure during a blow-molding process or may be multi-layered board composite design. In some implementations, the layers of the board 12 from top to bottom can include but not be limited to EVA, FG, PVC, FG, PE, PU, wood, metal and EPS. The board 12 can have a deck region 24 on its upper surface 16 that is shaped in order to allow a user to stand on the upper surface 16. The deck region 24 can be generally flat. At least a portion of the upper surface 16 can be recessed such that it lies below the side rails running along the sides of the board 12. The deck region 24 of the board 12 can be non-skid or non-slip surface that allows the operator to stand (or optionally, sit, kneel, or lay) on the deck region 24 while reducing the likelihood of sliding off the board into the water. The deck region 24 can include one or more traction pads. The top surface 16, or alternatively just the deck region 24, can be optionally made of ethylene vinyl acetate also known as EVA. EVA is a polymer that approaches elastomeric materials in softness and flexibility, yet can be processed like other thermoplastics or polymers. The material can have good clarity and gloss, barrier properties, low-temperature toughness, stress-crack resistance, hot-melt adhesive waterproof properties, and resistance to UV radiation.

Figure 18B:
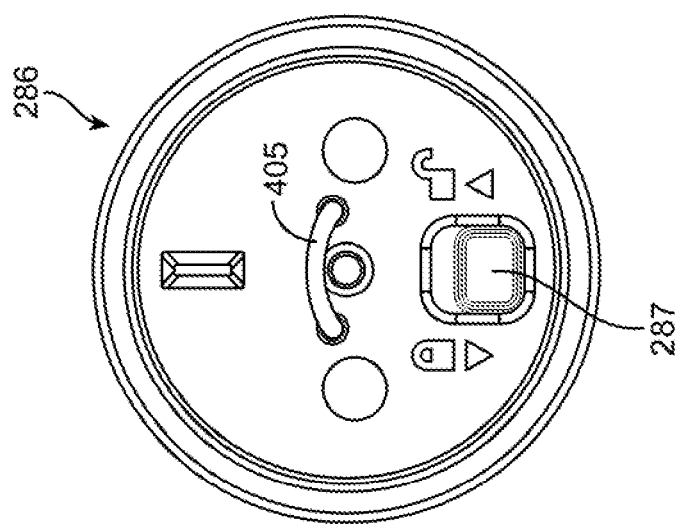
FIGS. 18A-18B show implementations of cords attached to various components of the steering system.
Figure 18A:
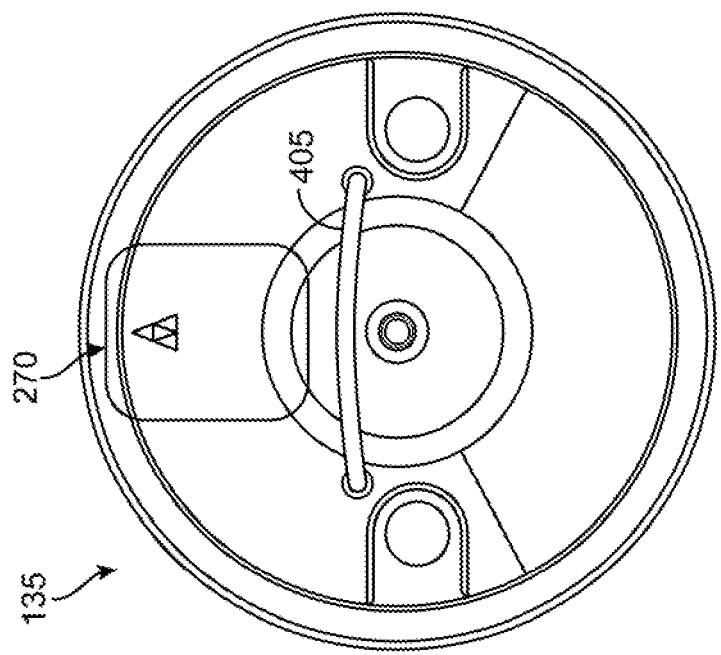

One or more features can be attached to the upper surface 16 of the board 12 and/or components of the steering system 14. For example, FIGS. 18A-18B show the tiller dummy 135 and the rudder spool 286, respectively. One or both of the tiller dummy 135 and the rudder spool 286 can have a cord 405, such as bungee cord or spectra cord, or a small piece of fabric, or other element that can allow for easy lifting. The board 12 can additionally include a lifting cord 405 or other element coupled to another region of the board 12 to allow for easy lifting (see FIG. 1).

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

What is claimed is:

1. A steering system for a vessel, comprising:
a tiller system having a tiller arm;
a rudder system having a rudder; and
a push rod system having a push rod linking the tiller arm to the rudder,
wherein actuation of the tiller arm moves the rudder in an orientation providing directional control over the vessel, and wherein the push rod system comprises a conduit for the push rod to slide within.

2. The system of claim 1, wherein the rudder comprises a lock-off mechanism.

3. The system of claim 2, wherein the lock-off mechanism secures the rudder to a user-configurable position that is equal to, less than or greater than a zero axis coincident to a center line of the vessel.

4. The system of claim 2, wherein the rudder is registered on a zero axis to ensure the rudder is coincident to a center line of the vessel prior to use and the lock-off mechanism maintains the rudder on the zero axis upon release of the tiller arm.

5. The system of claim 4, wherein when the rudder is in the zero axis position a leading edge and trailing edge of the rudder are coincident to the center line of the vessel.

6. The system of claim 1, wherein the tiller system comprises an active tiller set comprising a tiller, the tiller arm, a tiller cup and a spring.

7. The system of claim 6, wherein the active tiller set is usable for steering and is positioned on at least one side of a center line of the vessel.

8. The system of claim 7, wherein the tiller system further comprises a dummy tiller set positioned on an opposite side of the center line of the vessel from the active tiller set, the dummy tiller set comprising a tiller, a tiller cup, and a dummy cover.

9. The system of claim 8, wherein the dummy cover covers the tiller cup and does not have active steering capabilities.

10. The system of claim 9, wherein the active tiller set and the dummy tiller set are interchangeable between the starboard side and port side of the vessel.

11. The system of claim 6, wherein the tiller has a first end coupled to the tiller cup and a second end forming the tiller arm extending away from the tiller cup.

12. The system of claim 11, wherein the tiller cup is positioned within a recess of the vessel and is sized and shaped to receive at least a portion of the tiller.

13. The system of claim 6, wherein the tiller arm is dynamic and directly actuatable by a user's foot or hand, or indirectly actuatable via a remote control.

14. The system of claim 1, wherein actuation of the tiller arm comprises moving the tiller arm back and forth around a rotational axis of the tiller arm.

15. The system of claim 14, wherein moving the tiller arm around the rotational axis causes the push rod to rotate the rudder in an orientation that gives way to the directional control of the vessel.

16. The system of claim 1, wherein the tiller arm is positioned generally parallel to a deck region of the vessel.

17. The system of claim 16, wherein the tiller arm comprises a grip feature projecting upwards away from the deck region.

18. The system of claim 1, wherein the tiller arm is configured to be actuated from the starboard side, the port side of the vessel, or both the starboard side and the port side.

19. The system of claim 1, wherein the tiller arm is removable and configured to be installed on either or both the starboard or port side.

20. The system of claim 1, wherein the tiller arm has a form factor that is low profile such that a user can stand atop the tiller arm.

21. The system of claim 6, wherein the spring of the active tiller set is a non-mechanical torsion spring.

22. The system of claim 21, wherein the spring is a solid, unitary piece of flexible material having a c-shape.

23. The system of claim 21, wherein the spring supplies a force when deformed upon rotation of the tiller arm around a rotational axis of the tiller arm.

24. The system of claim 21, wherein the torsion spring has a return-to-center effect such that the spring returns the rudder to a zero degree position relative to the centerline of the vessel when no lateral load is imposed upon the spring.

25. The system of claim 21, wherein the spring ensures the tiller system and the rudder system are registered on a zero axis such that the rudder is coincident to the center line of the vessel along the zero axis.

26. The system of claim 1, wherein the push rod provides synchronized movement between the tiller arm and the rudder.

27. The system of claim 1, wherein the push rod is a solid material that allows a push-pull effect from the tiller arm to the rudder providing a direct and powerful steering impulse.

28. The system of claim 6, wherein the push rod is secured at one end to a region of the tiller cup and at an opposite end to a region of a rudder cup.

29. The system of claim 28, wherein the push rod is secured within the tiller cup by way of a push rod stopper.

30. The system of claim 1, wherein the conduit provides protection of the push rod against damage.

31. The system of claim 1, wherein the conduit is recessed within channels formed internally below a top surface of a deck of the vessel.

32. The system of claim 31, wherein the conduit is plumbed into the deck of the vessel such that the tiller arm remains generally parallel to the deck of the vessel.

33. The system of claim 1, wherein the conduit is installed externally to a top surface of a deck of the vessel.

34. The system of claim 1, wherein the push rod moves freely through the conduit upon actuation of the tiller system.

35. The system of claim 1, wherein the conduit provides a watertight seal.

36. The system of claim 1, wherein the push rod system comprises two push rods extending through respective conduits.

37. The system of claim 1, wherein the conduit is a tubular element connecting a rudder cup to a tiller cup.

38. The system of claim 37, wherein the tiller cup has a first conduit connection tube on an inside of the tiller and a second conduit connection tube on an outside of the tiller such that the push rod is connectable on the right or the left side of the tiller cup and the tiller determines in which direction the rudder moves when the tiller arm is actuated.

39. The system of claim 38, wherein when the push rod is mounted to the inside of the tiller via the first conduit connection tube, the push rod moves the rudder in a first direction upon movement of the tiller arm to the left.

40. The system of claim 39, wherein when the push rod is mounted to the outside of the tiller via the second conduit connection tube, the push rod moves the rudder in a second opposite direction upon movement of the tiller arm to the left.

41. The system of claim 1, wherein mounting of the push rod to the tiller system inverts the orientation when the tiller arm is actuated in the same manner.

42. The system of claim 1, wherein the rudder system further comprises a pre-fin attached by a hinge to the rudder.

43. The system of claim 42, wherein the pre-fin has a sloping shape.

44. The system of claim 1, wherein the vessel is a stand-up paddle board, prone board, kayak, canoe, or boat.

* * * * *